US011423327B2

(12) United States Patent
Kocberber et al.

(10) Patent No.: US 11,423,327 B2
(45) Date of Patent: Aug. 23, 2022

(54) OUT OF BAND SERVER UTILIZATION ESTIMATION AND SERVER WORKLOAD CHARACTERIZATION FOR DATACENTER RESOURCE OPTIMIZATION AND FORECASTING

(71) Applicant: Oracle International Corporation, Redwood Shores, CA (US)

(72) Inventors: Onur Kocberber, Baden-Daettwil (CH); Felix Schmidt, Baden-Daettwil (CH); Craig Schelp, Vancouver (CA); Andrew Brownsword, Vancouver (CA); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 772 days.

(21) Appl. No.: 16/156,925

(22) Filed: Oct. 10, 2018

(65) Prior Publication Data
US 2020/0118039 A1 Apr. 16, 2020

(51) Int. Cl.
*H04L 29/08* (2006.01)
*G06N 20/00* (2019.01)
(Continued)

(52) U.S. Cl.
CPC ............ *G06N 20/00* (2019.01); *G06F 1/266* (2013.01); *H04L 67/42* (2013.01)

(58) Field of Classification Search
CPC combination set(s) only.
See application file for complete search history.

(56) References Cited

U.S. PATENT DOCUMENTS 9,009,687 B2 4/2015 Caira
9,311,248 B2 4/2016 Wagner
(Continued)

FOREIGN PATENT DOCUMENTS

CN 107 769 972 A 3/2018
CN 108712292 A 10/2018

OTHER PUBLICATIONS

Wikipedia, "OpenFlow", http://en.wikipedia.org/wiki/OpenFlow, last viewed on Oct. 24, 2018, 4 pages.
(Continued)

*Primary Examiner* — Jude Jean Gilles
(74) *Attorney, Agent, or Firm* — Hickman Becker Bingham Ledesma LLP

(57) ABSTRACT

Techniques are described herein for estimating CPU, memory, and I/O utilization for a workload via out-of-band sensor readings using a machine learning model. The framework involves receiving sensor data associated with executing benchmark applications, obtaining ground truth utilization values for the benchmarks, preprocessing the training data to select a set of enhanced sequences, and using the enhanced sequences to train a random forest model to estimate CPU, memory, and I/O utilization given sensor monitoring data. Prior to the training phase, a machine learning model is trained using a set of predefined hyperparameters. The trained models are used to generate estimations for CPU, memory, and I/O utilizations values. The utilization values are used with workload context information to assess the deployment and generate one or more recommendations for machine types that will best serve the workload in terms of system utilization.

20 Claims, 17 Drawing Sheets

(51) Int. Cl.
   *H04L 67/01* (2022.01)
   *G06F 1/26* (2006.01)

(56) References Cited

U.S. PATENT DOCUMENTS

| | | | |
|---|---|---|---|
| 9,729,312 | B2 | 8/2017 | Bathen |
| 9,760,395 | B2 | 9/2017 | Doherty et al. |
| 9,785,492 | B1 | 10/2017 | Neumann et al. |
| 10,216,558 | B1 | 2/2019 | Gaber et al. |
| 10,726,930 | B2 | 7/2020 | Sarkar et al. |
| 11,310,247 | B2 | 4/2022 | Manadhata et al. |
| 2003/0200134 | A1 | 10/2003 | Leonard et al. |
| 2007/0168498 | A1* | 7/2007 | Lambert ............. H04L 43/0817 709/224 |
| 2007/0294736 | A1* | 12/2007 | Brady ................... G06Q 10/06 725/86 |
| 2014/0101117 | A1 | 4/2014 | Uzzaman |
| 2015/0287057 | A1 | 10/2015 | Baughman et al. |
| 2016/0028599 | A1 | 1/2016 | Vasseur et al. |
| 2017/0372232 | A1* | 12/2017 | Maughan ............. G06F 3/0482 |
| 2018/0027063 | A1* | 1/2018 | Nachimuthu ........ G06F 13/409 709/226 |
| 2018/0034966 | A1* | 2/2018 | te Booij ............. H04M 3/5232 |
| 2018/0046926 | A1 | 2/2018 | Achin et al. |
| 2018/0060211 | A1 | 3/2018 | Allen |
| 2018/0060220 | A1 | 3/2018 | Yao |
| 2018/0097744 | A1 | 4/2018 | Hu et al. |
| 2018/0365581 | A1* | 12/2018 | Vasseur .................. H04L 41/16 |
| 2019/0018614 | A1 | 1/2019 | Balko |
| 2019/0094286 | A1 | 3/2019 | Becher et al. |
| 2020/0045049 | A1 | 2/2020 | Apostolopoulos |
| 2020/0076840 | A1 | 3/2020 | Peinador |
| 2020/0118039 | A1 | 4/2020 | Kocberber et al. |
| 2020/0134423 | A1* | 4/2020 | Shinde ................ G06F 11/0787 |
| 2021/0089927 | A9 | 3/2021 | Ryan et al. |

OTHER PUBLICATIONS

Vmware, "How a Hypervisor-Converged Doftware-Defined Data Center Enables a Better Private Cloud", White Paper, dated 2014, 17 pages.
Software-Defined Networking (SDN) Definition, "Open Networking Foundation", https://www.opennetworking.org/sdn-definition/ last viewed on Oct. 24, 2018, 11 pages.
SearchServerVirtualization, "Why You Need VM Monitoring", https://searchservervirtualization.techtarget.com/tip/Why-you-need-VM-monitoring-tools, last viewed on Oct. 30, 2018, 4 pages.
Oracle Technology Network, "Oracle Integrated Lights Out Manager", https://www.oracle.com/technetwork/server-storage/servermgmt/tech/integrated-lights-out-manager/index last viewed on Oct. 30, 2018, 1pg.
OpenConfig, "Vendor-neutral, Model-Driven Network Management Designed By Users", dated 2016, 1 page.
Kanev et al., "Profiling a warehouse-scale computer", ISCA'15, Jun. 13-17, 2015, Portland, OR USA, 12 pages.
Iqbal et al., "Using SNMPV3 for Resources Monitoring of Hosted and Bare-Metal Hypervisors", dated May 2016, 9 pages.
Harrington et al., "An Architecture for Describing Simple Network Management Protocol (SNMP) Management Frameworks", dated Dec. 2002, 64 pages.
Dstat, "Linux Man Page", https://linux.die.net/man/1/dstat, last viewed on Oct. 30, 2018, 7 pages.
Claise et al., "Specification of the IP Flow Information Export (IPFIX) Protocol for the Exchange of Flow Information", dated Sep. 2013, 76 pages.
Bishop, Christopher, "Exact Calculation of the Hessian Matrix for the Multi-layer Perceptron", Published in Neural Computation 4 No. 4 (1992), 8 pages.
Barroso et al., "The Datacenter as a Computer", An Introduction to the Design of Warehouse—Scale Machines, Morgan and Claypool Publishers, dated May 2009, vol. 24, 156 pages.
Perozzi et al., "DeepWalk: Online Learning of Social Representations", dated 2014, 10 pages.
Ding et al., "PCA-Based Network Traffic Anomaly Detection" Tsinghua Science and Technology, vol. 21, No. 5, Oct. 2016, 10 pages.
Garcia-Duran et al. "Learning Graph Representations with Embedding Propagation", 31st Conference on Neural Information Processing Systems (NIPS 2017), 12 pages.
Gibert et al., "Graph Embedding in Vector Spaces", GbR'2011 Mini-tutorial, dated 2011, 66 pages.
Grover et al., "node2vec: Scalable Feature Learning for Networks", KDD '16, Aug. 13-17, 2016, San Francisco, CA, USA, 10 pages.
Hamilton et al., "Inductive Representation Learning on Large Graphs", 31st Conference on Neural Information Processing Systems (NIPS 2017), Long Beach, CA, USA, 11 pages.
Hamilton et al., "Representation Learning on Graphs: Methods and Applications", Copyright 2017 IEEE, 24 pages.
Bengio et al., "Learning Deep Architectures for AI", dated 2009, 71 pages.
Maglaras et al. "A real time OCSVM Intrusion Detection module with low overhead for SCADA systems", International Journal of Advanced Research in Artificial Intelligence, vol. 3, No. 10, 2014, 9 pgs.
Zhang et al., "Automated IT System Failure Prediction: A Deep Learning Approach", dated 2016, 11 pages.
Scholkopf et al. "Estimating the Support of a High-Dimensional Distribution", dated Nov. 27, 1999, 28 pages.
Wei et al., "Graph embedding based feature selection", Neurocomputing 93 dated May 17, 2012, 11 pages.
Xu et al. "Detecting Large-Scale System Problem by Mining Console Logs", SOSP'09, Oct. 11-14, 2009, 15 pages.
Yamanishi et al., "Dynamic Syslog Mining for Network Failure Monitoring", KDD'05 Aug. 21-24, 2005, Chicago, Illinois, USA, 10 pages.
Yen et al., "Beehive: Large-Scale Log Analysis for Detecting Suspicious Activity in Enterprise Networks", ACSAC '13 dated Dec. 9-13, 2013, New Orleans, Louisiana, USA, 10 pages.
Zhang et al., "Network Anomaly Detection Using One Class Support Vector Machine", Proceedings of the International MultiConference of Engineers and Computer Scientists 2008 vol. I, Mar. 19, 2008, 5 pages.
Liu et al., "Isolation Forest", dated 2008, 10 pages.
Wolfram MathWorld, "Inner Product", https://mathworld.wolfram.com/InnerProduct.html, dated 2004, 2 pages.
Talagala et al., "Meta-Learning How to Forecast Time Series", Department of Econometrics and Business Statistics, 2018, 30 pages.
Feuz et al., "Ranking and Automatic Selection of Machine Learning Models Abstract", Technical Disclosure Commons, Dec. 13, 2017, 34 pages.
Eskridge et al., "Separating Different Scales of Motion in Time Series of Meteorological Variables", Bulletin of The American Meteorological Society, 78(7), 1997, pp. 1473-1484.
Chujai et al., "Time Series Analysis of Household Electric Consumption With ARIMA and ARIMA Models", Lecture Notes in Engineering and Computer Science, 2013, pp. 295-300.
Peinador, U.S. Appl. No. 16/122,398, filed Sep. 5, 2018, Office Action, dated Oct. 28, 2020.
An et al., "Variational Autoencoder based Anomaly Detection Using Reconstruction Probability", 2015-2 Special Lecture on IE, dated Dec. 27, 2015, 18 pages.
Hetherington, U.S. Appl. No. 16/140,841, filed Sep. 25, 2018, Final Rejection, dated Nov. 2, 2021.
H. S. Hota et al., "Time Series Data Prediction Using Sliding Window Based RBF Neural Network", International Journal of Computational Intelligence Research, vol. 13, No. 5, 2017, pp. 1145-1156.
Andrey Ignatov, "Real-time human activity recognition from accelerometer data using Convolutional Neural Networks", Applied Soft Computing, 62, 2018, pp. 915-922.
Hetherington, U.S. Appl. No. 16/140,841, filed Sep. 25, 2018, Advisory Action, dated Jan. 20, 2022.

(56) References Cited

OTHER PUBLICATIONS

Bergstra et al., "Hyperopt: A Python library for model selection and hyperparameter optimization", Computational Science & Discovery 8, 2015, 25 pages.

* cited by examiner

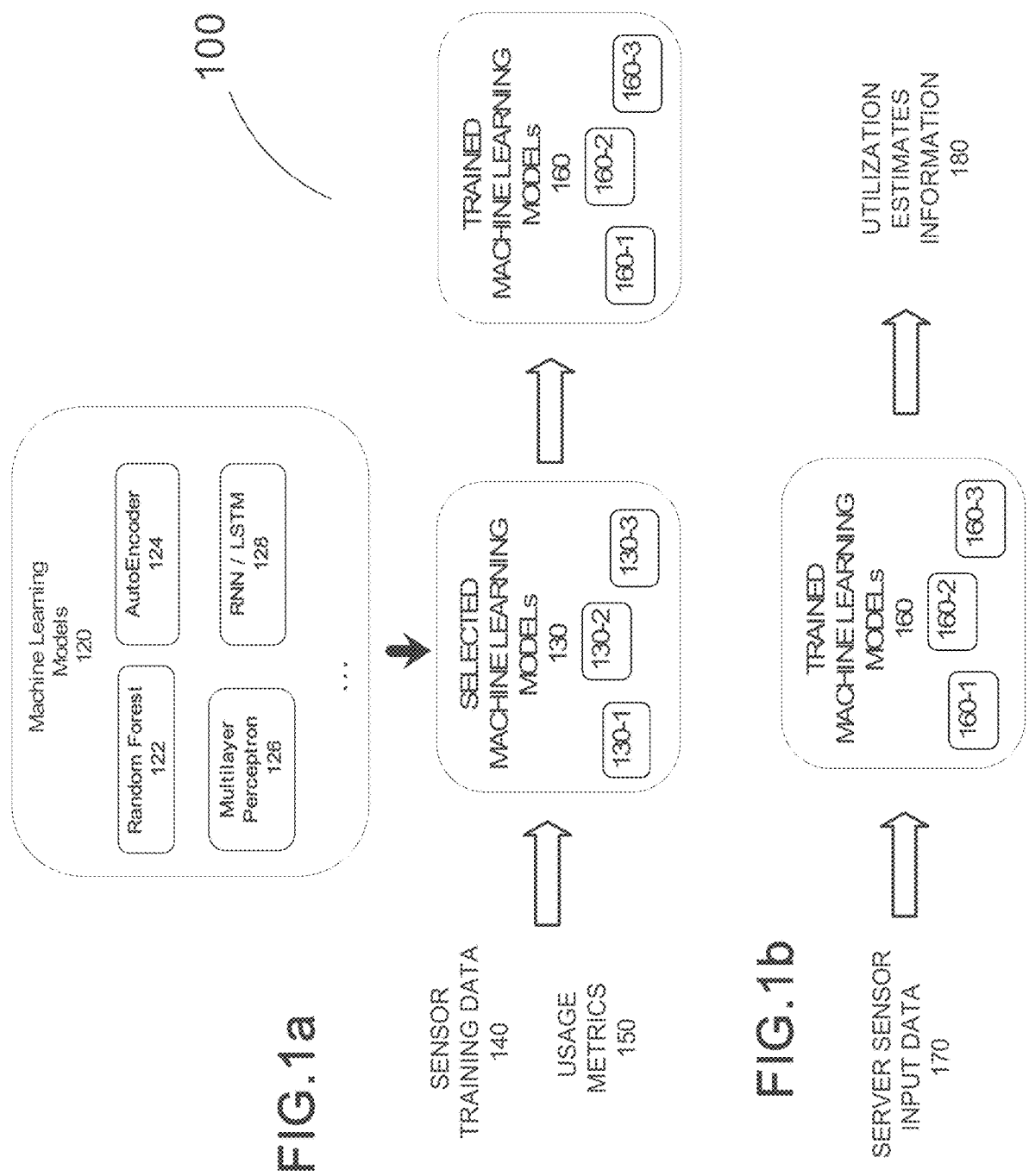

FIG. 2

| Sensor Name 210 | Sensor Type 220 |
|---|---|
| /SYS/VPS_MEMORY | Memory Power |
| /SYS/VPS_FANS | Power to Fans |
| /SYS/VPS_CPU | Processor Power |
| /SYS/VPS | Overall Chassis Power |
| /SYS/T_AMB | Ambient Temperature |
| /SYS/T_CORE_NET | Temperature of Network Interface on Motherboard |
| /SYS/MB/T_OUT_A | Outlet Temperature at location A on Motherboard |
| /SYS/MB/F3/TACH | Speed of Fan 3 on Motherboard |
| /SYS/MB/F2/TACH | Speed of Fan 2 on Motherboard |
| /SYS/MB/F1/TACH | Speed of Fan 1 on Motherboard |

200

OUT OF BAND SERVER UTILIZATION ESTIMATION AND SERVER WORKLOAD CHARACTERIZATION FOR DATACENTER RESOURCE OPTIMIZATION AND FORECASTING

FIELD OF THE INVENTION

The present invention relates to a framework for estimating server, memory, and I/O utilization parameters and characterizing server workload using out-of-band server sensors.

BACKGROUND

Datacenter utilization is a prime optimization target for lower operational costs and higher quality of service. Server, memory, and I/O utilization parameters are important metrics in datacenter utilization.

Often, server utilization information is generated by the operating system and monitored with various operating system tools. Acquiring such server utilization information may contribute to a reduction in server security and/or negatively affect server performance.

Furthermore, acquiring server utilization on a given server machine necessitates a legitimate user account on the target host. In the cases where the operating systems run on a hypervisor (i.e., virtualized host), valid access to hypervisor is required. On bare-metal servers (for e.g., Oracle Cloud™ Infrastructure), customers are provided full control of their operating system; accessing the customer's software computing stack is not feasible. Therefore, in such cases, accessing the server utilization information is not possible.

Security and privacy concerns aside, even when accessing the operating system is possible, acquiring server utilization parameters results in executing instructions on the host CPU, stealing CPU cycles from the host machine. Although the acquisition may have a negligible overhead on powerful superscalar processors, the acquisition operations may overwhelm lean, energy-efficient processors.

In a cloud datacenter, lack of knowledge regarding server utilization makes resource allocation, capacity planning, maintenance planning, demand forecasting, and certain security operations very challenging. To bring this capability, some servers (e.g., DELL x86 servers) leverage enhanced out-of-band monitoring capabilities, by using custom utilization counters existing on an Intel chipset called Intel Management Engine (ME). Unfortunately, in order to enable these counters, the server must employ a specific hardware agent (e.g., ME-compatible motherboard and chipset). Even when this specific agent exists on the server, the chipset may be vulnerable to intrusion as it may create a backdoor. Any mechanism that is susceptible to security vulnerabilities presented by these chipsets will not be employed by cloud providers with stringent security requirements.

Thus, server utilization is crucial for datacenter efficiency. However, obtaining this information should not create security holes and should have no discernable impact on resources of a target machine. The current industry solutions do not meet all of these requirements simultaneously.

In another aspect, datacenter utilization is a prime optimization target for lower operational costs and higher quality of service (QoS). Due to the massive scale and complexity of datacenters, machine allocation and workload scheduling within the centers is a challenging task. Furthermore, as datacenters age, several generations of servers co-exist, further exacerbating of managing datacenter utilization.

Allocating the optimal resources for a given workload requires understanding the requirements of the workloads. The high-level requirements of a workload could be a specific number of cores, specific amounts of memory and I/O bandwidth. In a cloud datacenter or a high-performance computing (HPC) cluster, the workloads are scheduled based on requirements as specified by the users/admins before runtime. More advanced systems may also account for detailed workload needs such as data locality. However, the high-level requirements, exclusively picked by user/admins, do not always translate to the actual resource consumption, since the high-level requirements are statically determined before runtime and may be prone to human inaccuracies. In order to fully characterize a workload, quantifying the consumption of CPU cycles, memory bandwidth, and I/O bandwidth during the life of the application is important.

For reasons explained above, bare-metal cloud offerings further complicate the workload characterization problem since none of the profiling techniques in virtualized clouds should be applied to bare-metal clouds. Thus, there is a need for cloud workload characterization with the following properties: (i) Characterizing deployed (in-situ) workloads without accessing low-level hardware information only available internally to the host (e.g., hardware counters, operating system files), (ii) Characterizing the workloads without imposing additional overhead on the target host.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 1A depicts a machine learning system learning system a server's instantaneous utilization, memory bandwidth utilization, I/O bandwidth utilization, and workload characterization using server sensor data.

FIG. 1B depicts a machine learning system for utilization estimates that include server utilization estimates, memory utilization estimates, and/or network I/O utilization estimates.

FIG. 2 depicts an example of sensor data received from the sensors according to an embodiment.

DETAILED DESCRIPTION

Figure 3:
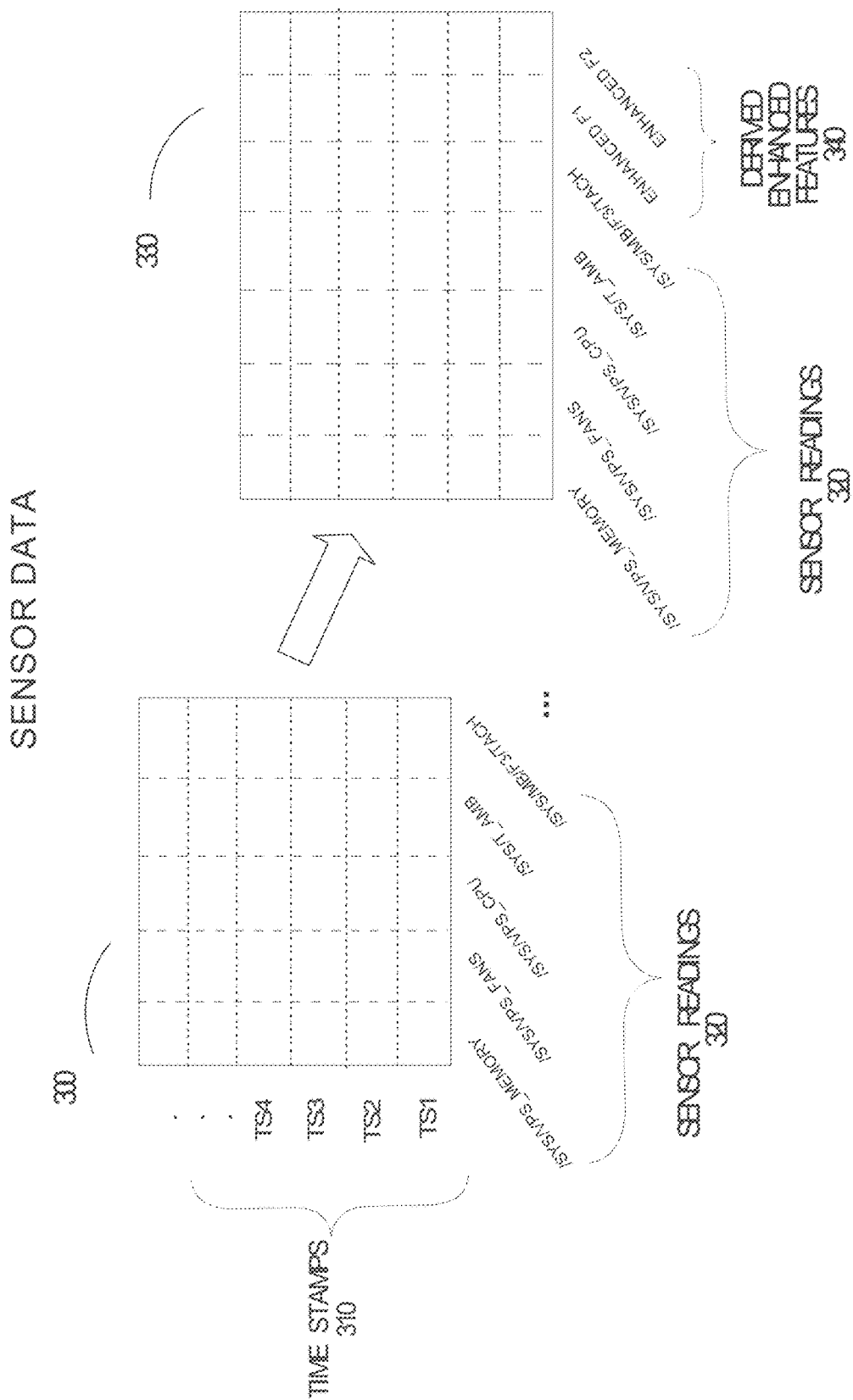
FIG. 3 depicts an example of the input data matrix that is generated as input to a machine learning model according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Described herein is a framework for training a machine learning system to estimate a server's instantaneous utilization, memory bandwidth utilization, I/O bandwidth utilization, and workload characterization using server sensor data. The server sensor data is collected out-of-band. By out-of-band, it is meant the sensor data is collected independently and without involving the participation of a server's CPU, operating system, and main memory. Server sensor data includes metrics about power usage, fan speed, temperature, which are measured by various sensors in a computer. Server utilization as well as different other components such as memory and I/O have non-trivial relationships with various power, temperature, fan speed, among other components in a server.

Server sensor data, in its broadest sense, may be generated by operating system utilities. However, as the term is used herein after, server sensor data refers to server sensor data generated out-of-band.

The machine learning system learns these relationships by training on various collected sensor readings against computer resource usage metrics ("usage metrics") at different utilization points. The trained machine learning model ("ML model") may then be used to generate estimations of utilization given server sensor data, and to create server-workload signatures that may be used for assessing how good a given server allocation is for a particular workload.

FIG. 1A depicts a machine learning system 100. The system 100 may have stored within it, several ML models 120 that may be used for training. These ML models may include, without limitation, Random Forest 122, Autoencoder 124, Multilayer Perceptron 126, and Recurrent Neural Networks (RNN)/Long Short-Term Memory (LSTM) 128. Selected ML models 130 (130-1, 130-2, and 130-3) are trained using Sensor Data 140 along with Usage Metrics 150 values for learning to estimate each of at least server utilization, memory utilization, and network I/O utilization.

In supervised ML model, the input to the machine learning model comprises Sensor Data 140 and the output comprises Usage Metrics 150.

To train a ML model to estimate server utilization, Usage Metrics 150 values includes usage metrics generated from operating system utilities. Such usage metrics include server usage metrics (e.g. metrics about CPU utilization, number of processes, threads), memory usage metrics (e.g. metrics about memory bandwidth utilization, memory space utilization), and network I/O usage metrics. After testing and validation is performed, satisfactory trained ML models 160 (160-1, 160-2, and 160-3) are stored for performing utilization estimations given sensor data.

FIG. 1B depicts the trained ML models 160 that may be used subsequently with Server Sensor Input Data 170 in order to output Utilization Estimate Information 180. The utilization estimate information may be server utilization estimates, memory utilization estimates, and/or network I/O utilization estimates.

Computational Framework

Embodiments described herein operate on server sensor data. The server sensor data involves sensor readings that are collected for various server types under consideration. Some embodiments described herein include the following phases within a computational framework:
  (i) Sensor data collection. Data normalization and down-sampling when necessary
  (ii) Feature enhancement and selection.
  (iii) Training and creating utilization estimation ML models for each of CPU, memory, I/O utilization using out-of-band sensor readings as input.
  (iv) Building a characterization model and workload signatures with the different utilization models from phase (iii).
  (v) Assessing a particular deployment score by inputting the characterization models to a recommendation model These phases are described in detail below:

Out-of-Band Sensor Data Collection

Server sensor data is collected by a sub-system ("out-of-band subsystem") that is separate from a server or computer's main CPU. An out-of-band subsystem comprises a main controller, referred to herein as a baseboard management controller (BMC), that is connected to various components, including sensors and other controllers ("satellite controllers") distributed among different computer components.

The sensors and other satellite controllers connect to the BMC via a bus. The BMC may be accessed via a local area network or serial bus using Intelligent Platform Management Interface (IPMI) and Simple Network Management Protocol (SNMP), without participation of the server's main CPU.

BMCs can support complex instructions and provide complete out-of-band functionality of a service processor. The BMC manages the interface between operating system and/or hypervisor and the out-of-band subsystem.

A BMC may use a dedicated memory to store server sensor data that stores metrics captured by sensors or satellite controllers, such metrics being about temperature, fan speed, and voltage. The sensor data may be accessed using the complex instruction set.

FIG. 2 depicts a Table 200 of examples of server sensors and the types of sensor data readings that may be collected from them. It depicts a column of Sensor Names 210 and a corresponding column of Sensor Types 220. The depicted sensors are a few of the many kinds of sensors that may be used—including power sensors, temperature sensors, fan-speed sensors, and power supply sensors. Suffixes and prefixes such as "MEMORY", "CPU", "FAN", "MB" refer to specific components.

Examples of out-of-band subsystems, interfacing with out-of-band subsystems, and server sensor data are described in: "Virtual Communication Interfaces for A Micro-Controller", U.S. patent application Ser. No. 10/691,071, filed by Ranen Chattejee, et al. on Oct. 21, 2003, the entire content of which is incorporated herein by reference; U.S. patent application Ser. No. 13/786,695, Power Profiling Application for Managing Power Allocation in an Information Handling System, filed by Michael A. Brundridge, et al., on Mar. 6, 2013, the entire content of which is incorporated herein by reference; and Oracle Integrated Lights Out Manager (ILOM) 3.1, Part No.: E24525-08, published by Oracle Corporation on Feb. 4, 2014, the entire content of which is incorporated herein by reference.

Training Data Collection

In embodiments described herein, for each server class or machine type that is used, a mix of benchmarks that stress CPU, memory, network I/O, and hard disk I/O are leveraged. These benchmarks allow the capture of a wide spectrum of usage metrics in a short amount of time. While running these benchmarks, data collection (i.e., label, ground truth data) is initiated for use in training the ML models.

In some embodiments, training data is collected by collecting server sensor reading (see Poll_sensors( ) below) and usage metrics (see Get_real_utilization( ) below). The collected data is concatenated with a timestamp to form training data. The server sensor readings serve as training input and the usage metrics serving as training output. The training data may be stored in a file in CSV ("comma separated values") format. The training input may be further processed to generate enhanced features and a matrix for training ML models, as described below.

The pseudo-code below depicts the Sensor Reading and Usage Collection Algorithm. The data collection runs on a remote machine and repeats every 'poll_interval' seconds. Poll interval is a constant number depending on the estimation granularity. The collection stops when the benchmarks complete execution.

While (true):
Sensors=Poll_sensors( )
Real_utilization=
get_real_utilization( )
Append_to_output(timestamp( ), sensors,
real_utilization) Sleep(poll_interval)

Pseudo-Code: Sensor Reading and Usage Collection Algorithm

Server Usage Metrics Collection

For server usage metrics collection (i.e., ground truth), which may be the utilization calculated by an operating system (i.e., Linux) tools may be used. These tools run on a target machine in order to collect the real server utilization, and then send results to a remote machine where the Sensor Reading and Usage Metrics Collection Algorithm is executed. Similarly, if target hosts are running different operating systems such as Windows or MacOS, the system monitoring utilities provided by those operating systems may be used to collect usage metrics.

Memory Usage Metrics Collection

To estimate the memory bandwidth, some embodiments described herein leverage a memory benchmark (could be developed in-house or obtained publicly available) that fully utilizes the available memory bandwidth on a given server. Furthermore, the memory benchmark may operate at arbitrary utilization points with arbitrary access patterns, allowing the collection of sensor data at different utilization points with various access patterns.

Network I/O Usage Metrics Collection

Embodiments described herein collect usage metrics for estimating network I/O-bandwidth utilization from three sources (i) the switch utilization counter on the physical switch connected to the machine, (ii) operating system network utilities, and (iii) provider edge (PE) device. The advantage of using the switch utilization counter on the physical switch is that no agents are executed on the target host for collecting the usage metrics, but the data is averaged over a predefined window. An advantage of using operating system network utilities is the ability to access finer granularity link usage metrics by running a light-weight agent on the machine. The advantage of using provider edge devices is providing advantages of (i) and (ii) at the cost of additional telemetry collection from PE devices. Overall, these techniques achieve the same goal and depending on the systems logistics, a decision may be made to employ a specific one of the three sources.

Feature Enhancement and Feature Selection

In embodiments described herein, the data collected from the training data collection (i.e., ground truth), stage mentioned above is assimilated and transformed into a matrix. The data is cleaned for null values and normalized. Optionally, the data may be down sampled. The down-sampling may be needed if the poll interval is too small compared to the benchmark behavior.

In an embodiment described herein, an input matrix is created as training input from time stamped sensor feature values. The columns of the input matrix represent "training input features" which correspond to different types of sensor readings that are captured. The rows are timestamped feature values. FIG. 3 depicts an example of a <P×M> input matrix 300 that defines the raw data received from the sensors. The matrix column depicts the M Sensor Readings 320, and the rows define P Time Stamps 310 at which the sensor readings are obtained. In certain circumstances, several Time Stamps and related sensor readings could be compressed into one (e.g., averaged, aggregated) for improving model performance and/or accuracy. In some embodiments described herein, the raw data represented in the <P×M> matrix may be preprocessed to generate an enhanced feature input matrix of <P×N>330. Thus N−M extra features are derived from the M sensor readings to form the Derived Enhanced Features 340 that are added to generate the enhanced feature input matrix 330.

The feature enhancement step may involve creating new training input features from other training input features. For example, it may be found that on two socket servers, there are two Ethernet controller temperature sensors. While each individual sensor temperature reading is useful, the temperature difference between the two readings may also be useful to distinguish between one socket and two socket behaviors. Therefore, this is added as a new column for a Derived Enhanced Feature 340.

The pseudo-code below depicts Feature Selection Algorithm. For each feature generated by training data collection, the correlation is calculated between the target usage metric and the feature. The target usage metric may be a server usage metric, a memory usage metric, or a network I/O usage metric. If there is a correlation that is greater than a pre-specified threshold, then this feature and its values are added to generate an enhanced feature input matrix that will be used in the machine learning stage. In some embodiments, the threshold is selected empirically depending on the accuracy of the ML model.

For f in input[features]:
   if correlation(input[f], input[target]) >
     threshold: machine learning input(input[f])

Pseudo-Code: Feature Selection Algorithm

Figure 4:
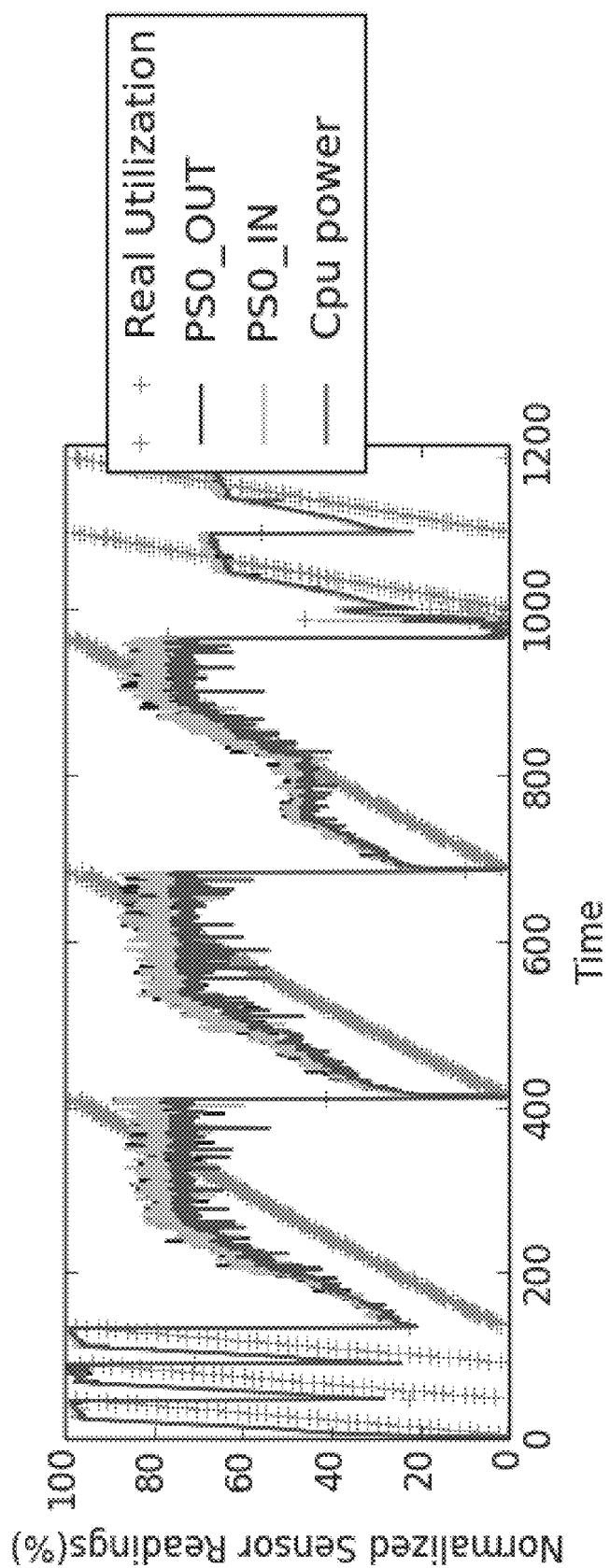
FIG. 4 is a graphical example of a relationship between the usage metrics and some features according to an embodiment.

FIG. 4 depicts the usage metrics and some of the highly correlated features, for example, CPU and power supply power consumption. In FIG. 4, each time that the real utilization goes from 0% to 100% (i. e., between times 200-400, 400-650, 650-100 . . . ), the benchmarks are stressing different components of the system and resulting in different power consumption behavior, as depicted.

According to an embodiment, separate sets of features are selected for each of server utilization ML modeling, memory utilization ML modeling, and network I/O utilization modeling. For server utilization ML modeling, target usage metrics would include server usage metrics. For memory utilization ML modeling, target usage metrics would include memory usage metrics. For network I/O utilization ML modeling, target usage metrics would include network usage metrics.

Figure 5:
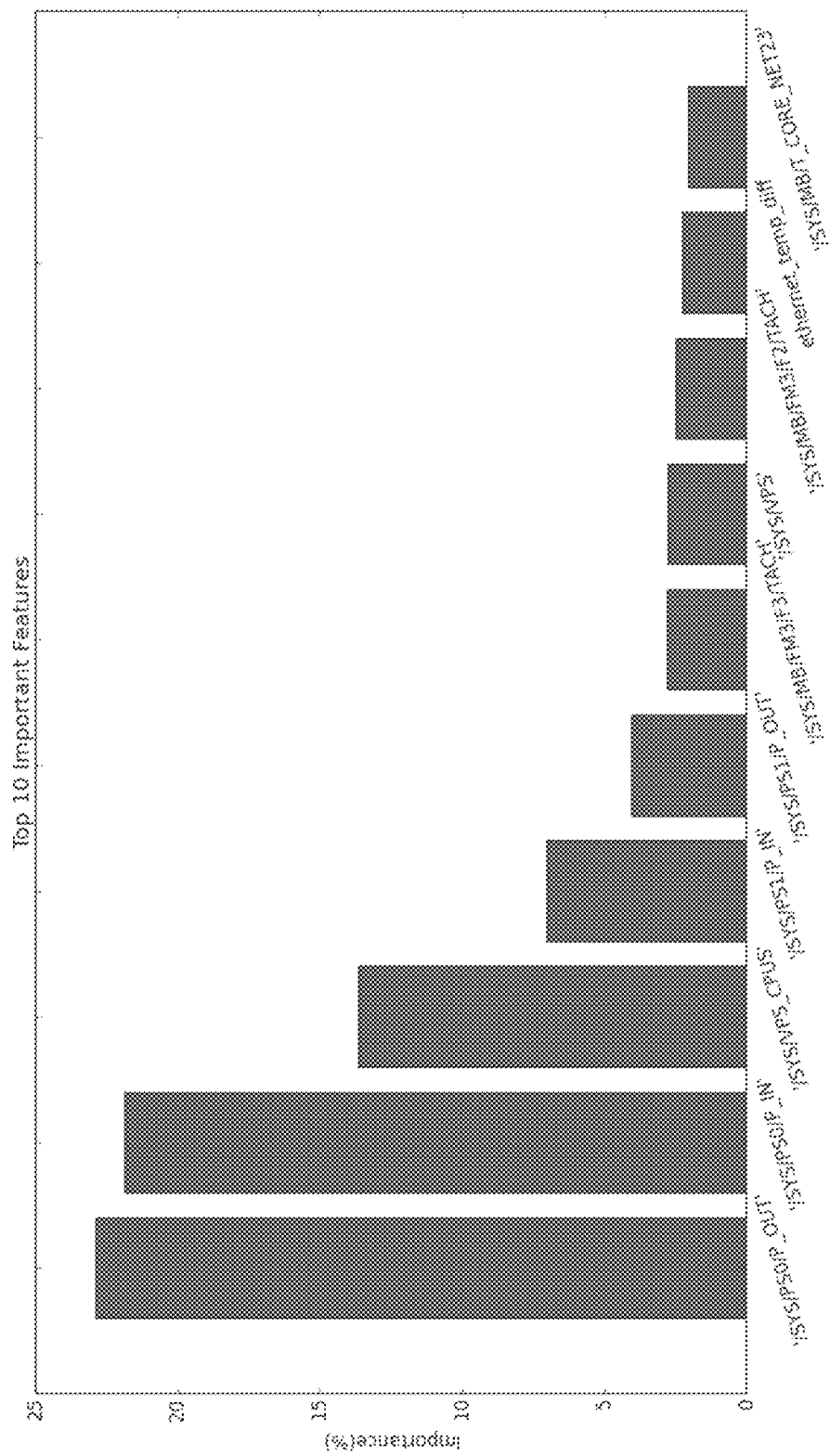
FIG. 5 is a graphical example of top features selected by the machine learning model for estimating server utilization according to an embodiment.

FIG. 5 depicts the top-10 most important features selected for a server utilization ML model in some embodiments described herein. The features include power related sensors (power supply, cpu), as well as the fan speeds, temperature, and the added features (e.g., ethernet_temp_diff). There may be ten to twenty features that qualify to the machine learning training stage. Even though only a handful of features have significant importance in terms of being correlated with the utilization, having features of less importance are important since they allow for capturing outlier cases in the utilization spectrum.

Figure 6:
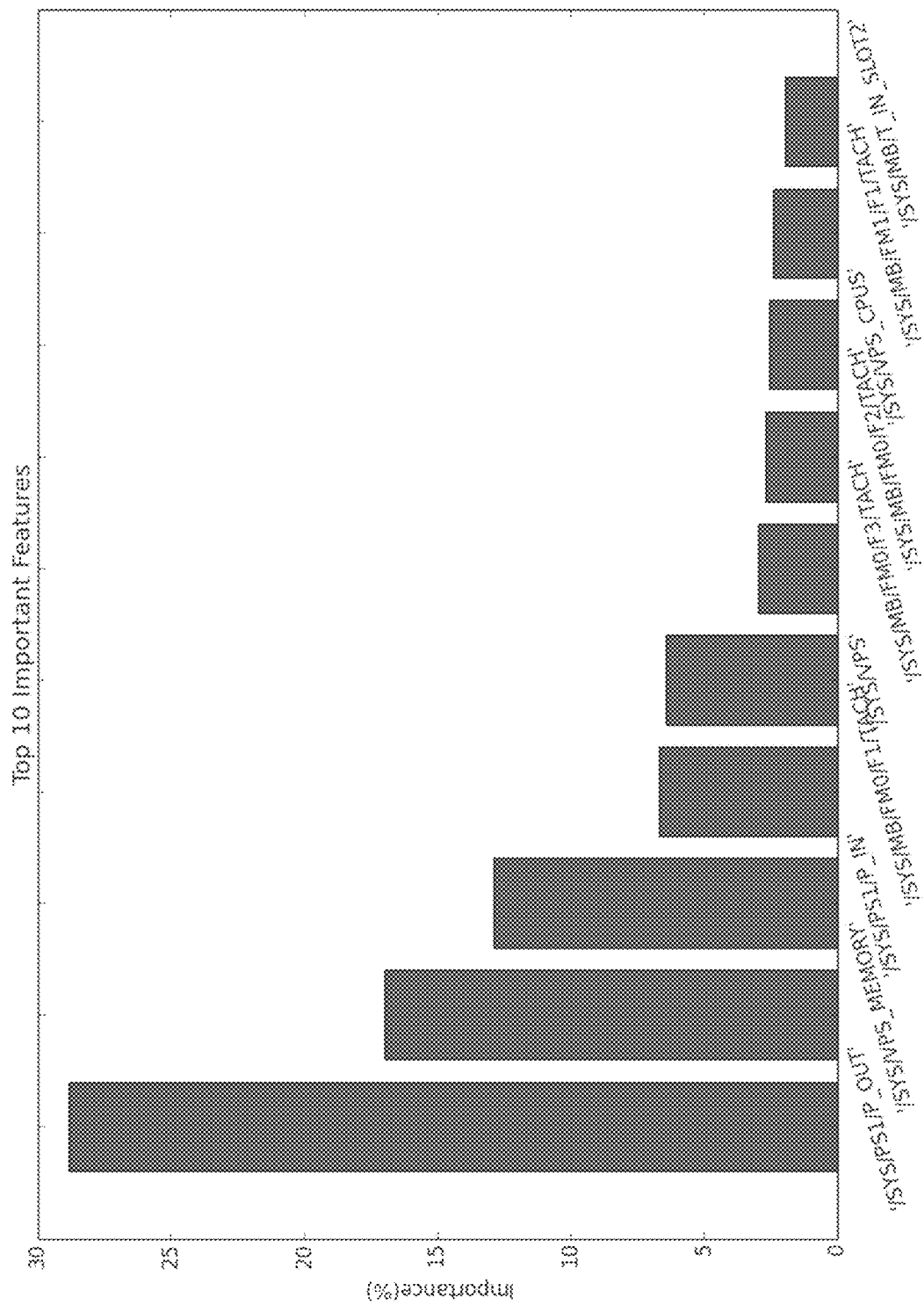
FIG. 6 is a graphical example of top features selected by the machine learning model for estimating memory utilization according to an embodiment.

FIG. 6 depicts the top-10 most important features picked by the memory bandwidth utilization ML model in some embodiments described herein. Furthermore, comparing the depictions in FIG. 5 and FIG. 6 demonstrates the importance of specific features during training of the ML models when trained with data as described above. There is a distinct difference between the features selected for the memory utilization model and the features selected for CPU utilization model. For example, in the memory bandwidth utilization model (shown in FIG. 6), memory power sensor (/SYS/VPS_MEMORY) is the second most important and the CPU power (/SYS/VPS_CPUS) has less than 5% importance. In contrast, it may be noted that in the CPU utilization model (shown in FIG. 5), CPU power ((/SYS/VPS_CPUS) is of almost 15% importance.

The set of features that are important for a server utilization model, memory bandwidth utilization ML model, or a CPU utilization model may vary between servers and/or between benchmarks used to generate the features. In addition, datacenter operators may select which features are important and/or are used.

Estimating Cpu, Memory, and Network I/O Utilization Using Trained ML Models

In embodiments described herein, during deployment, a trained model is input with instantaneous sensor readings to output utilization estimations for server, memory and network I/O utilization. The input may include enhanced features generated as described above.

Figure 7:
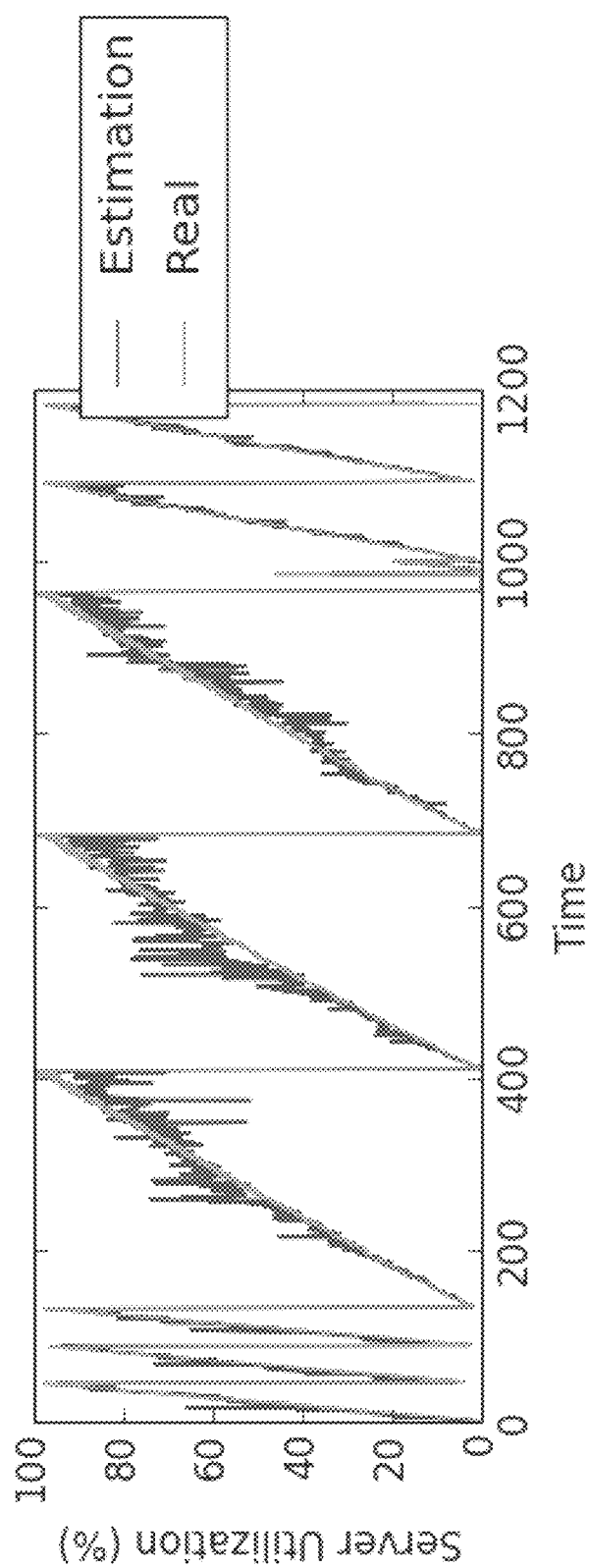
FIG. 7 is a graphical example of server utilization estimate according to an embodiment.

FIG. 7 depicts a plot of the server utilization estimation given by the trained model for an Oracle X6-2™ machine. It is found that utilizations with specific hyper-threading use are challenging to the trained ML model. This is because each hyper-threaded hardware context contributes to the utilization percentage as a normal core. However, hyper-threaded cores are not fully-fledged cores. The Random Forest machine learning algorithm partially corrects this error be using several other sensor readings. It may also be possible to create additional features to fully distinguish hyper-threaded utilization.

Figure 8:
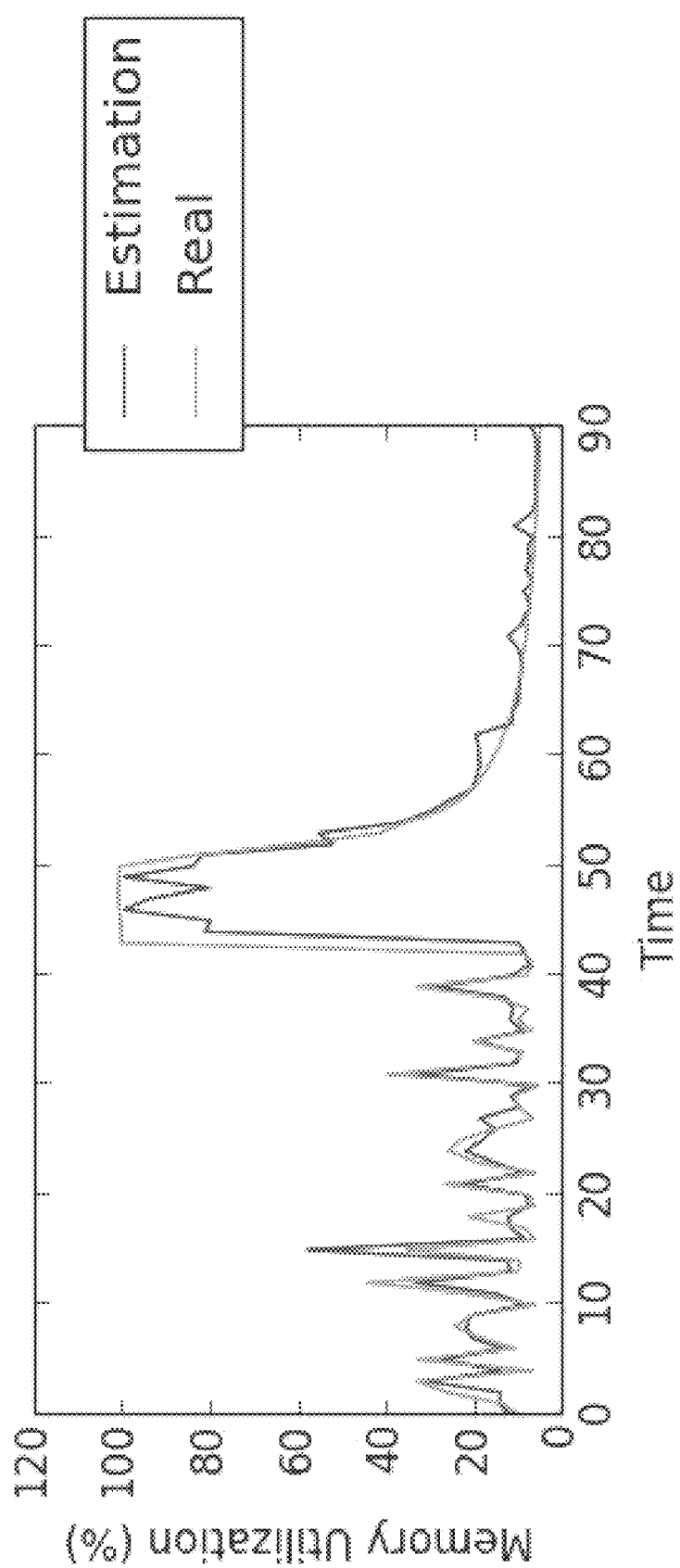
FIG. 8 is a graphical example of memory bandwidth utilization estimate according to an embodiment.

FIG. 8 depicts a plot of the memory bandwidth estimation given by the trained memory bandwidth utilization model. Overall, the model estimations closely follow the usage metrics, proving that the selected features are correlated with the real memory bandwidth utilization.

Figure 9:
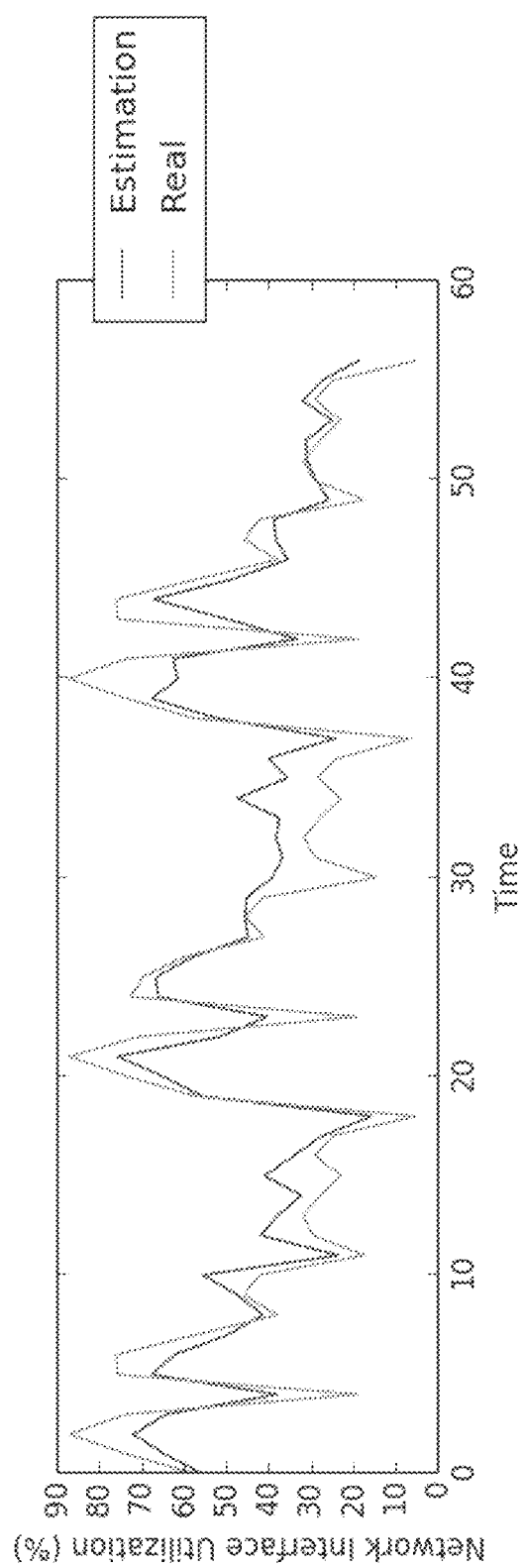
FIG. 9 is a graphical example of I/O bandwidth utilization estimate according to an embodiment.

FIG. 9 depicts network I/O-bandwidth utilization estimation when using link utilization counters on the physical switch as network usage metrics. To stress utilization, network benchmarks are used, allowing for adjustment of the utilization on the physical link. It may be observed that selected sensor readings are correlated with the network usage metrics and therefore, the ML model may be trained to learn the utilization behavior.

Embodiments described herein present approaches using the Random Forest ML model for learning ground truth. A Random Forest ML model is trained using an enhanced feature input matrix created from the previous stage. Subsequent to using several regression techniques, it is found that the Random Forests regression algorithm may perform best for this task. The most suited hyper-parameters were determined by employing several tuning stages in embodiments described herein. An embodiment of the present invention however is not limited to Random Forest ML model.

Figure 10:
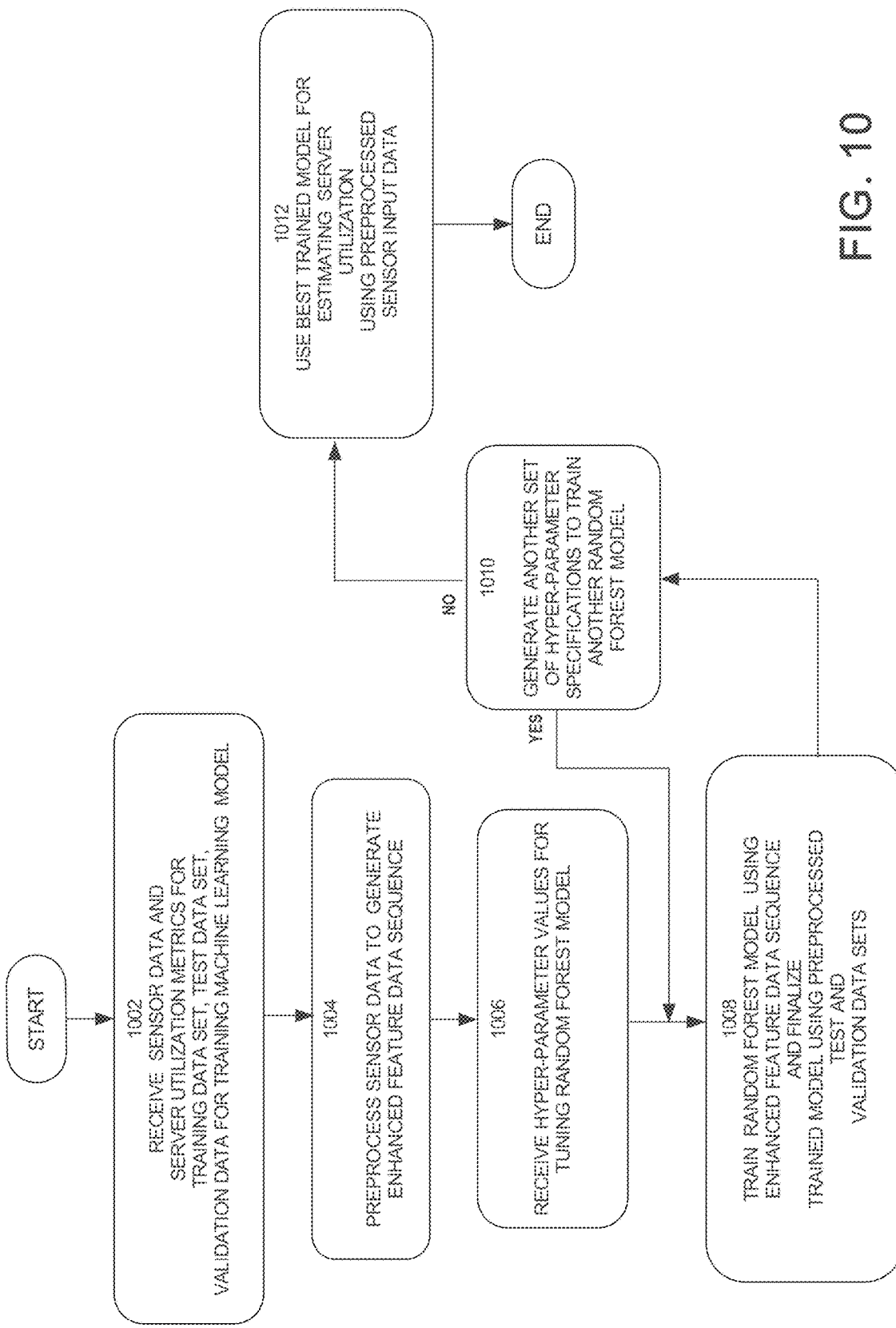
FIG. 10 depicts a flowchart for server utilization estimation according to an embodiment.

FIG. 10 is a flowchart illustrating a procedure for training a set of Random Forest ML models that can make estimations of server utilization, according to an embodiment of the invention. A best trained Random Forest ML model is selected from the set. The steps of FIG. 10 constitute merely one of many methods that may be performed to make predictions of server workload utilization. Other methods may include more or fewer steps in other orders than depicted in FIG. 10.

At step 1002, server sensor data is received from server sensors. The server sensor data and server usage metrics are used to form training input and output, respectively, and test sets as well as validation sets for training a random forest ML model.

In some embodiments, at step 1004, the server sensor data received in step 1002 is preprocessed to generate the preprocessed sequence training data that will be used to train Random Forest deep learning models. The preprocessing may include cleaning the readings for null values, normalizing the data, downsampling the features, etc. Further preprocessing may involve generating an enhanced feature set based on features selected for server utilization ML modeling as described above.

In an embodiment, at step 1006, hyper-parameter specifications are received for the Random Forest model to be trained. Without limitation, these hyper-parameters may include values of model parameters such as number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In step 1008, the Random Forest deep learning model is trained. The model is trained using the specified hyper-parameters and the preprocessed sequence training data. The trained model is evaluated using the preprocessed test and validation data sets.

At step 1010, a determination is made of whether to generate another set of hyper-parameter specifications. If so, another set of hyper-parameter specifications is generated and execution proceeds to step 1008 for training of another Random Forest model having the hypermeters specified.

Finally, at step 1012, the best trained Random Forest model may be used for performing server utilization estimation from server sensor readings that are preprocessed and applied to the trained Random Forest deep learning model. The best trained Random Forest model may be selected based on the evaluation performed for each trained Random Forest model in step 1008.

Figure 11:
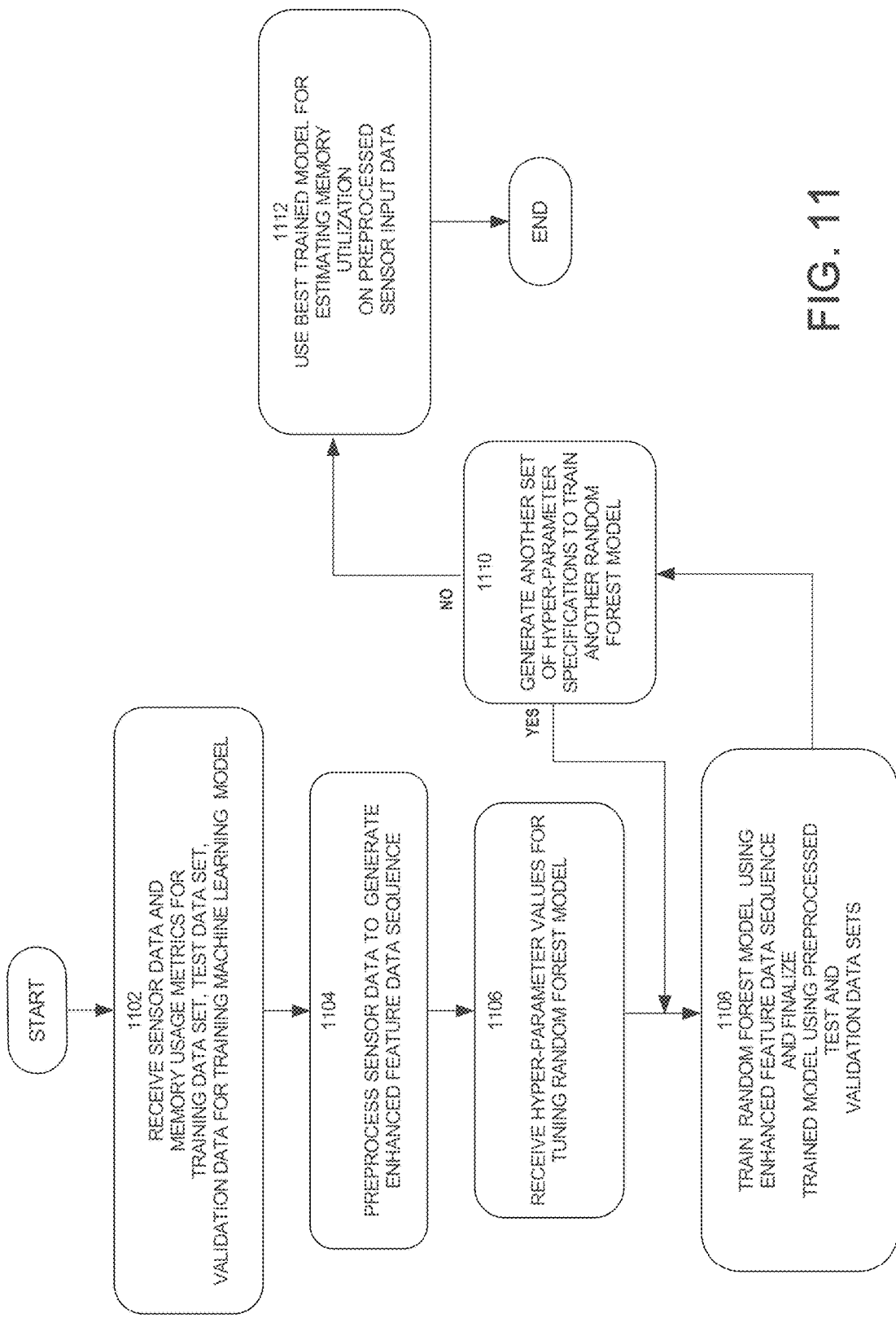
FIG. 11 depicts a flowchart for memory bandwidth utilization estimation according to an embodiment.

FIG. 11 is a flowchart 1100 illustrating a procedure for training a set of Random Forest models to make estimations of memory utilization, according to an embodiment of the invention. A best trained Random Forest ML model is selected from the set. The steps of FIG. 11 constitute merely one of many methods that may be performed to make predictions of disk failure. Other methods may include more or fewer steps in other orders than depicted in FIG. 11.

At step 1102, sensor data is received from server sensors and memory usage metrics. The server sensor data and memory usage metrics are used to form training input and output, respectively, and test sets as well as validation sets for training a random forest ML model.

In an embodiment, at step 1104, the sensor data received in step 1102 is preprocessed to generate the preprocessed sequence training data that will be used to train the deep learning model. The preprocessing may include cleaning the readings for null values, normalizing the data, downsampling the features, etc. Further preprocessing may involve generating an enhanced feature set based on features selected for memory utilization ML modeling as described above.

In an embodiment, at step 1106, hyper-parameter specifications are received for the Random Forest model to be trained. Without limitation, these hyper-parameters may include values of model parameters such as number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In step 1108, the Random Forest deep learning model is trained. The model is trained using the specified hyper-parameters and the preprocessed sequence training data. The training data may include the enhanced feature set for memory utilization ML modeling and the output may comprise the memory usage metrics. The trained model is evaluated using the preprocessed test and validation data sets.

At step 1110, a determination is made of whether to generate another set of hyper-parameter specifications. If so, another set of hyper-parameter specifications is generated and execution proceeds to step 1108 for training of another Random Forest model having the hypermeters specified.

Otherwise, at step 1112, the best trained Random Forest may be used for performing memory utilization estimation from server sensor readings that are preprocessed and applied to the trained Random Forest deep learning model. The best trained Random Forest model may be selected based on the evaluation performed for each trained Random Forest model in step 1108.

Figure 12:
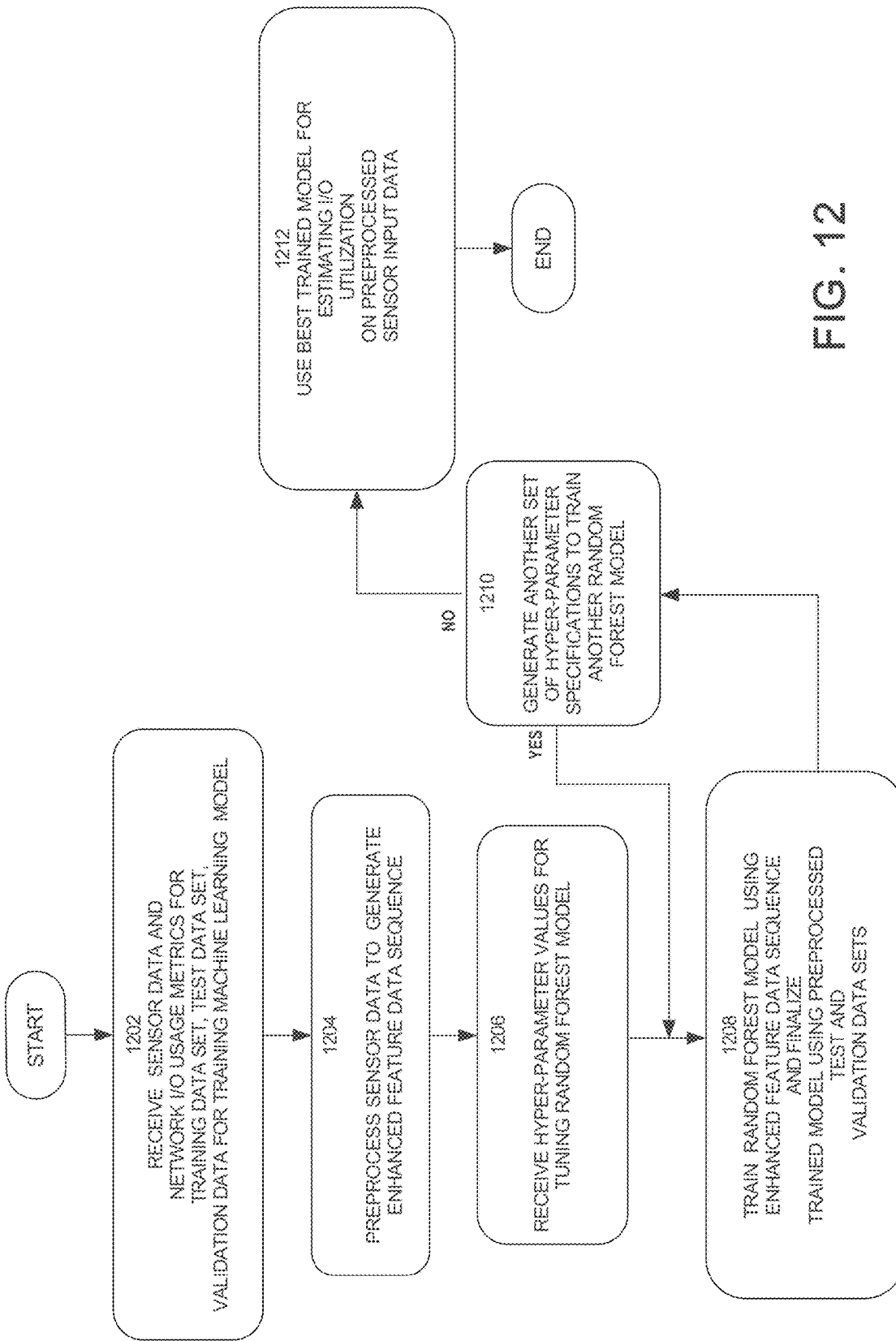
FIG. 12 depicts a flowchart for I/O bandwidth utilization estimation according to an embodiment.

FIG. 12 is a flowchart 1200 illustrating a method for training a set of Random Forest models for making estimations of network I/O utilization, according to an embodiment of the invention. A best trained Random Forest ML model is selected from the set. The steps of FIG. 12 constitute merely one of many methods that may be performed to make predictions of network I/O utilization. Other methods may include more or fewer steps in other orders than depicted in FIG. 12.

At step 1202, server sensor data is received from server sensors. The server sensor data and network I/O usage metrics are used to form training input and output, respectively, and test sets as well as validation sets for training a Random Forest ML model.

In some embodiments, at step 1204, the raw sensor readings received in step 1202 are preprocessed to generate the preprocessed sequence training data that will be used to train the Random Forest ML model. The preprocessing may include cleaning the readings for null values, normalizing the data, downsampling the features, etc. Further preprocessing may involve generating an enhanced feature set based on features selected for network I/O utilization ML modeling as described above.

In an embodiment, at step 1206, hyper-parameter specifications are received for the Random Forest deep learning model to be trained. Without limitation, these hyper-parameters may include values of model parameters such as number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In step 1208, the Random Forest deep learning model is trained. The model is trained using the specified hyper-parameters and the preprocessed sequence training data. The trained model is evaluated using the preprocessed test and validation data sets.

At step 1210, a determination is made of whether to generate another set of hyper-parameter specifications. If so, another set of hyper-parameter specifications is generated and execution proceeds to step 1210 for training of another Random Forest model having the hypermeters specified.

Otherwise, at step 1212, the best trained Random Forest model may be used for performing I/O utilization estimations from server sensor readings that are preprocessed and applied to the trained Random Forest deep learning model. The best trained Random Forest model may be selected based on the evaluation performed for each trained Random Forest model in step 1108.

Workload Characterization

Once separate utilization estimation ML models are trained for CPU, memory utilization and network I/O utilizations respectively, some embodiments described herein may use a specific workload's utilization components to characterize the deployed workload. The pseudo-code below depicts the Workload Signature Creation Algorithm. Using incoming sensor data, separate estimations are first generated for CPU, memory and network I/O utilizations. This information is then concatenated into an array and output as a vector. Depending on the use case, in some embodiments, multiple such vectors may be first created over a time-series of sensor readings. Subsequently, by employing thresholding and averaging techniques, some embodiments create a single signature. In other embodiments, context information containing machine and workload details are added to the signature. The details of the context information is explained in the next section.

```
def create_signature(sensor_data):
    models.add(cpu)
    models.add(memory)
    models.add(io)
    signature=[ ]
    signature.concat(sensor_data.context)
    for m in models:
        est=m.estimate(sensor_data)
        signature.concat(est)
    return signature
```

Pseudo-Code: Characterization Signature Creation Algorithm

Figure 13:
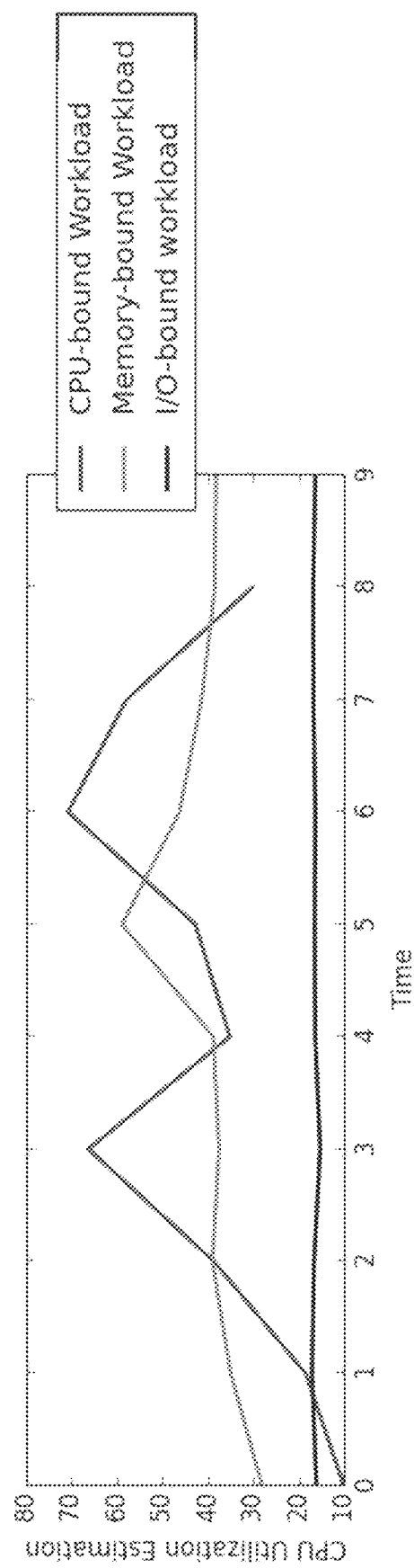
FIG. 13 is a graphical example of the testing a CPU-utilization model with different workloads according to an embodiment.

FIG. 13 is a depiction using a trained CPU-utilization model that is tested with different workloads. Sensor data is used as input from three different workloads, each stressing CPU, memory, and I/O respectively. The graphical depiction demonstrates that, for the CPU-bound workload, the model estimates the utilization with high precision. In contrast, when using the I/O-bound workload (with variable I/O utilization), it is observed that the CPU utilization model shows no sensitivity to the workload, proving that the model is able distinguish between different types of utilizations happening on the server. For memory-bound workload, the model depicts a sensitivity that is between that depicted for the CPU-bound workload and that depicted for the I/O-bound workload. This is explained by noting that memory utilization also results in moderate CPU utilization.

It is determined from testing the trained models on various workloads that a concatenation of the estimations (from 0% to 100%) from the three trained models along with context information will create a unique signature that will capture the character of a workload on a given server. This is used in embodiments of the present invention.

Assessing a Deployment Score

Figure 14:
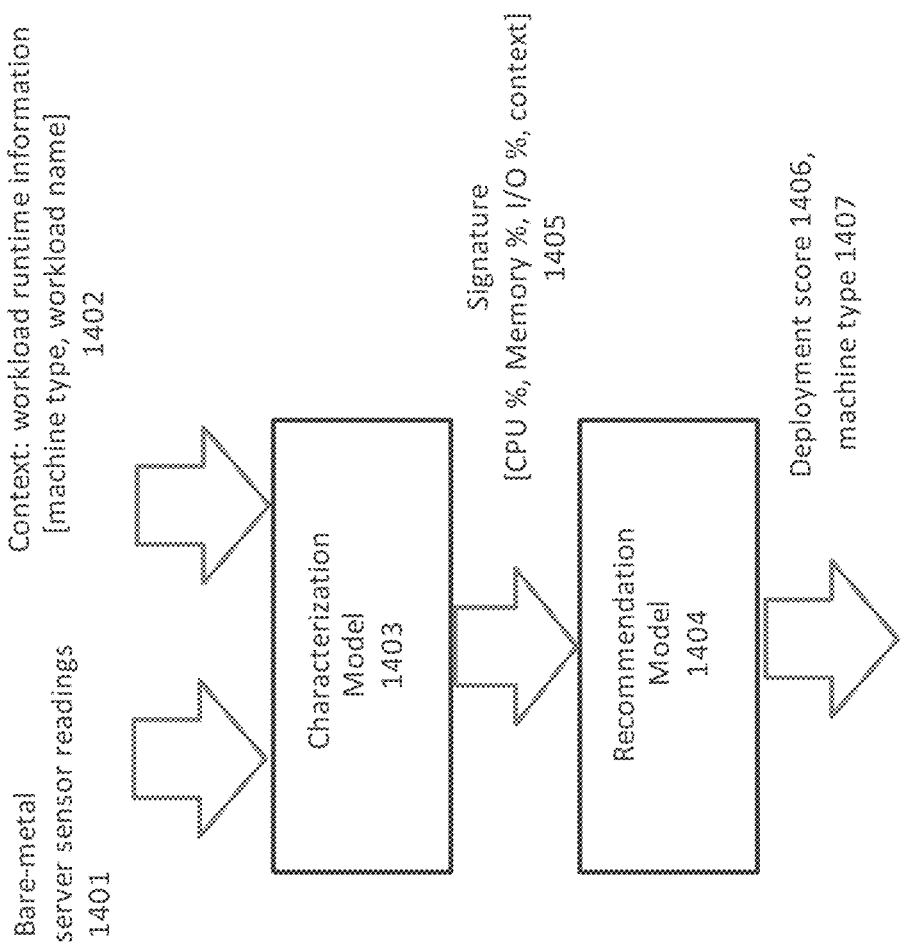
FIG. 14 is a block diagram depicting the workflow involved in assessing a workload-server pairing.

FIG. 14 is an overall block diagram of an embodiment for assessing a deployment score after the deployment of a workload on a server. Bare-metal sensor readings 1401 and workload runtime information 1402 are input to the Characterization Model 1403. The Characterization Model 1403 uses this information to create a signature 1405. The workload runtime information (also referred to as context) contains the machine type and workload name. The machine type is used for picking the right model trained for a particular server class or machine type. The workload name is an optional parameter that may facilitate more representative signatures by providing additional context. In general, the context information is needed to understand the machine type and/or workload.

A Recommendation Model 1404 takes the Signature 1405 as an input and decides regarding whether the given Signature 1405 is running on a suitable machine or not. By using the context information, and the current utilization numbers, the Recommendation Model 1404 generates a Deployment Score 1406 that assesses whether the current workload-server pair is a good match or not. The Recommendation Model 1404 may also suggest a Machine Type 1407 more suited to the needs of the current workload. With enough context provided, in some embodiments, the combined Deployment Score 1406 and Machine Type 1407 recommendation parameters are used before the deployment of the workload by taking advantage of historical data to actually deploy the workload appropriately within a facility. Overall, these decisions may be used to trigger relocation actions by the cloud provider leading to improved service quality, cost, and energy savings.

Functional Overview

In an embodiment, a computer-implemented process, computer system and computer program are provided for predicting CPU, memory, and I/O utilization using a Random Forest model. The system described herein may be implemented in any type of a data center facility or a cloud service provider facility wherein data stored in disks need to be monitored for health.

Figure 15:
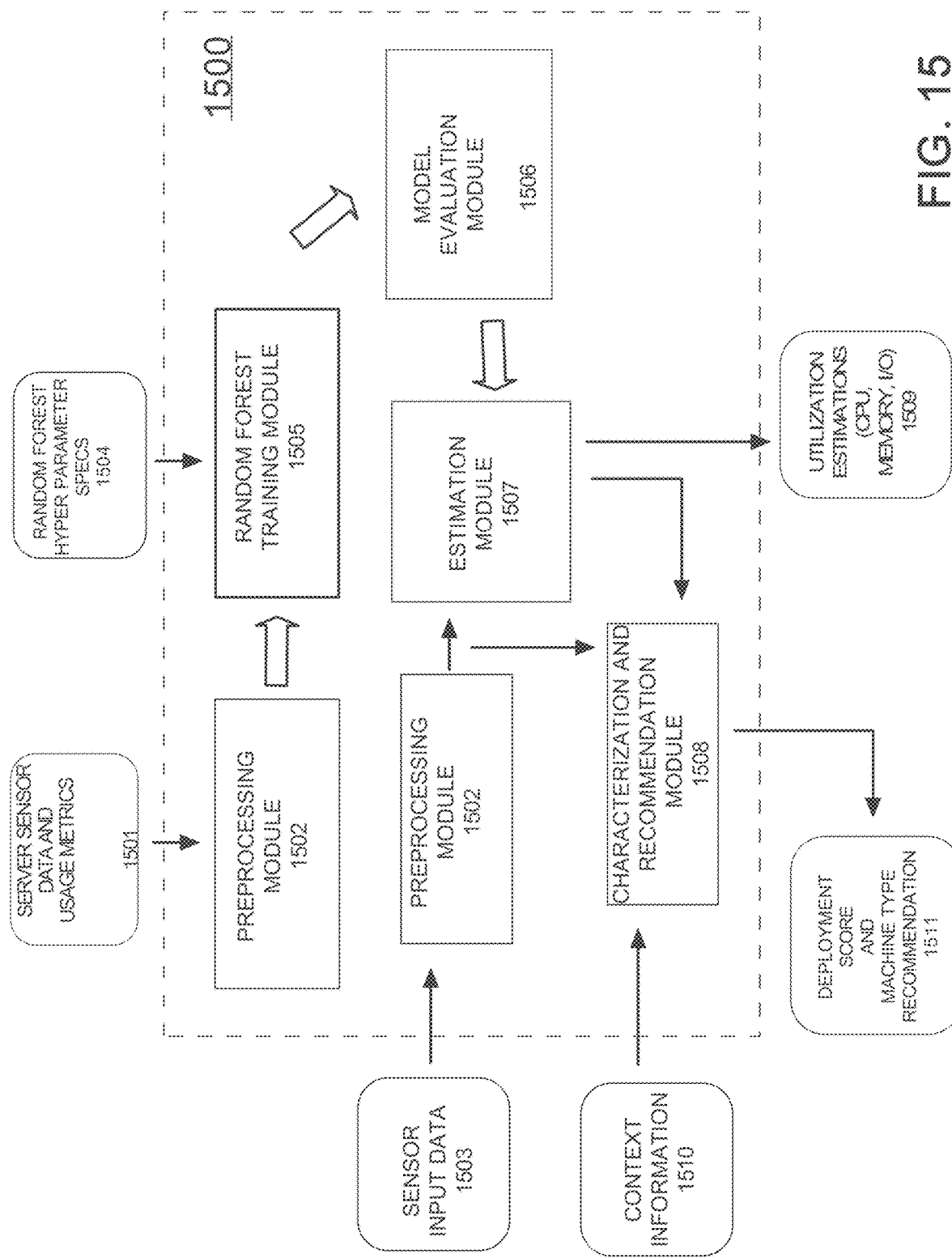
FIG. 15 is a functional overview of the system according to an embodiment.
Figure 16:
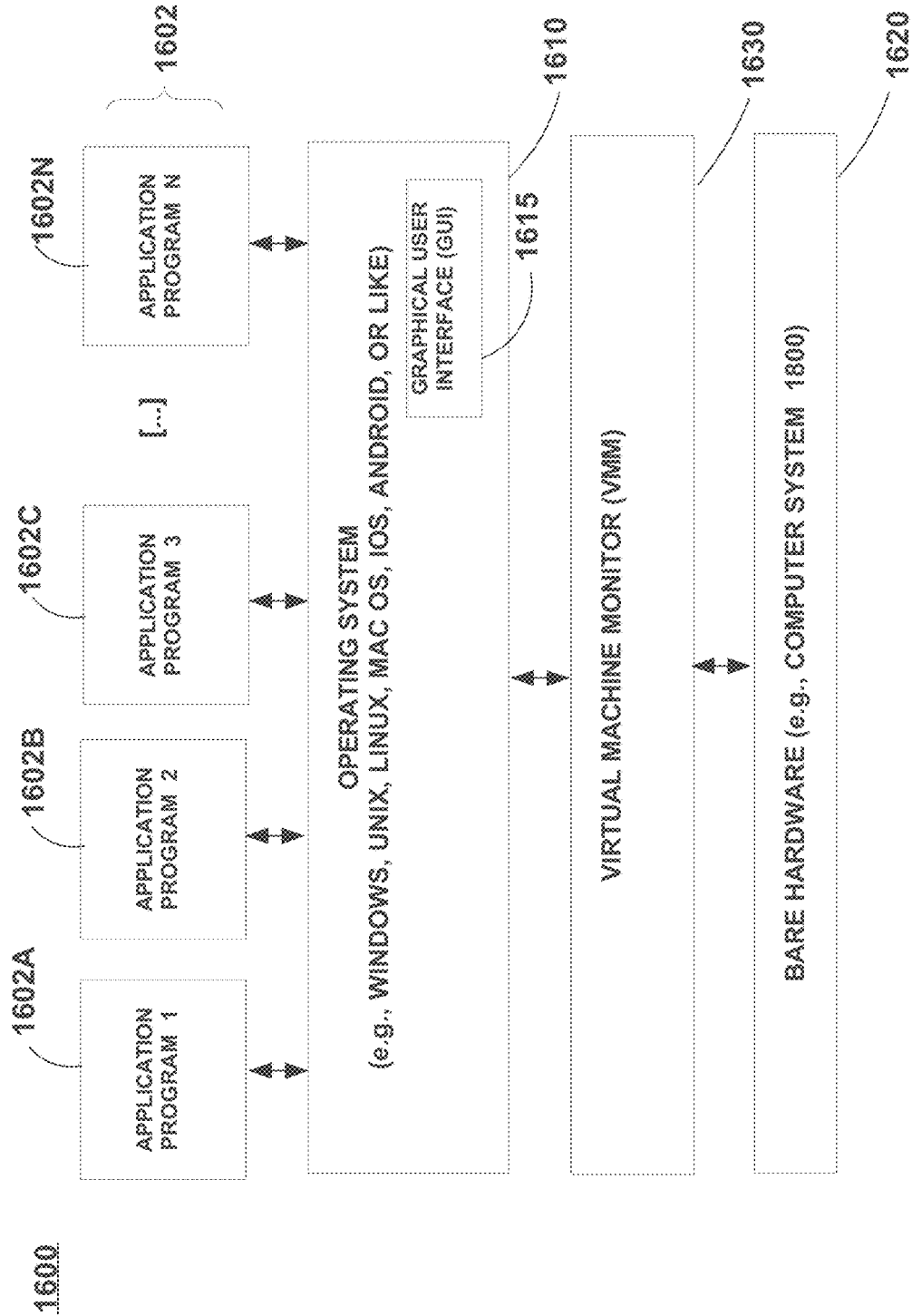
FIG. 16 is a diagram depicting a software system that may be used in an embodiment.

FIG. 15 is a functional overview of the system in some embodiments of the invention. In an embodiment, Computer System 1500 comprises a Preprocessing Module 1502.

The Preprocessing Module 1502 receives, as training data, test and validation data, Server Sensor Date and Usage Metrics 1501, the sensor data from server sensors monitoring various server attributes in a facility. The Preprocessing Module 1502 uses the sensor data to generate preprocessed sequence training data that will be used to train the learning model separately for each of CPU, Memory, and I/O utilization estimates. The preprocessing may include cleaning the readings for null values, normalizing the data, downsampling the features, etc. Further preprocessing may involve generating an enhanced feature set to be used for training, testing, and validation.

After the training is completed, the Preprocessing Module 1502 will receive the Sensor Input Data 1503 to be analyzed by the Estimation Module 1507 for making estimations about CPU, Memory, and I/O utilization.

During the training phase, the output of the Preprocessing Module 1502 is fed to the Random Forest Training Module 1505 for training the Random Forest models for learning each of CPU, Memory, and I/O utilizations respectively. Prior to training, the Training Module 1505 tunes the Random Forest models using hyper-parameter specifications 1504 that may be provided by a user to the System 1500. Without limitation, these hyper-parameters may include values of model parameters such as number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

The Model Evaluation Module 1506 is responsible for testing and validating the Random Forest models and establishing the trained Random Forest models that will then be used for analyzing the sensor data to estimate utilizations. Once the models have been trained, the Estimation Module 1507 will receive the preprocessed input data from sensor readings, and analyze the data using the trained Random Forest models and provide as output, estimations regarding CPU, memory and I/O utilization 1509.

Finally, the preprocessed sensor readings, the generated estimates from the ML models, and any extra workload context information 1510 is provided as input to the Characterization and Recommendation Module 1508 which generates, as output, a Deployment Score and a Machine Type Recommendation 1511 regarding machine type suitable for the workload.

Advantages Over Other Approaches

Embodiments of the invention described herein provide several advantages over other approaches. These are discussed below:

Describe herein are novel approaches for estimating a server's instantaneous CPU, Memory, and I/O bandwidth utilization using server sensors. Utilization parameters have a non-trivial relationship (also known as power proportionality) with various power, temperature, and fan speed sensors. Embodiments described herein leverages various power, temperature, and fan speeds which are correlated with different components (CPU, memory, I/O) of the server. These relationships are learned by collecting different sensor readings of the server at various utilization points, then training ML models to accurately estimate them. Subsequent to learning the relationships, embodiments described herein create server-workload signatures, which are used for assessing how good a given server allocation for a particular workload is.

The significant improvements of one or more embodiments:
  Server utilization estimation is completely out-of-band, not necessitating access to the host operating system (or hypervisor)
  Estimation operation does not create an additional load on the server
  Workload characterization estimation is completely out-of-band, not necessitating access to the processor performance counters, host operating system, and/or hypervisor.
  Does not create an additional load on the server or violates the privacy of the user or operating system data.

The significant technical differences of an embodiment of the invention are:
  Obviates the need for employing an additional hardware agent that may introduce security holes into the facility
  Obviates the need for pre- and/or during-deployment application profiling.
  Applicable to any server architecture with power and temperature sensors accessible via out-of-band management interface (e.g., x86, ARM, SPARC).

The embodiments described herein improve technical functionality within cloud providers due to:
  Lower TCO: The embodiments enable tenant-level energy- and power-related optimizations, which could be previously only done at the rack-level.
  Datacenter management: Utilization information is a valuable input for capacity planning, resource management, and workload scheduling.
  Maintenance planning: Utilization information can help scheduling any repair/maintenance with some QoS guarantees.
  Security: Insights into the tenant server utilization helps identifying fraudulent behavior.

Furthermore, workload characterization and associated signatures allow for rack- and datacenter-level optimizations depending on whether they are used after or before deployment. The enhanced functionalities are as follows:
  After deployment
    In-situ analysis of datacenter state with respect to how different resources are utilized
    Operational input for datacenter resource utilization forecasting
  Pre-deployment
    Reduction in datacenter operational cost via guided resource allocation and placement
    Better application quality of service and throughput Machine Learning Model A machine learning model is trained using a particular machine learning algorithm. Once trained, input is applied to the machine learning model to make a prediction, which may also be referred to herein as a predicated output or output.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, executed, and/or as generating an output or predication, a computer system process executing a machine learning algorithm applies the model artifact against the input to generate a predicted output. A computer system process executes a machine learning algorithm by executing software configured to cause execution of the algorithm.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C #, Ruby, Lua, Java, Matlab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input node, the activation value is simply an input value for the input. For an activation neuron, the activation value is the output of the respective activation function of the activation neuron.

Each edge from a particular node to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation node, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of nodes in layer L−1 and L is N[L−1] and N[L], respectively, the dimensions of matrix W of N[L−1] columns and N[L−1] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input node. The particular input may be stored as vector. Training data comprises multiple inputs, each being referred to as sample in a set of samples. Each sample includes a value for each input node. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every node in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of nodes and/or edges determines the size of matrices needed to implement a neural network. The smaller the number of nodes and edges in a neural network, the smaller matrices and amount of memory needed to store matrices. In addition, a smaller number of nodes and edges reduces the amount of computation needed to apply or train a neural network. Less nodes means less activation values need be computed, and/or less derivative values need be computed during training.

Properties of matrices used to implement a neural network correspond neurons and edges. A cell in a matrix W represents a particular edge from a node in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. number of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake a I as an L because those letters have similar features. Correct output may have particular value(s), while actual output may have different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Autoencoder implementation and integration techniques are taught in related U.S. patent application Ser. No. 14/558,700, entitled "AUTO-ENCODER ENHANCED SELF-DIAGNOSTIC COMPONENTS FOR MODEL MONITORING". That patent application elevates a supervised or unsupervised ANN model as a first class object that is amenable to management techniques such as monitoring and governance during model development such as during training.

Deep Context Overview

As described above, an ANN may be stateless such that timing of activation is more or less irrelevant to ANN behavior. For example, recognizing a particular letter may occur in isolation and without context. More complicated classifications may be more or less dependent upon additional contextual information. For example, the information content (i.e. complexity) of a momentary input may be less than the information content of the surrounding context. Thus, semantics may occur based on context, such as a temporal sequence across inputs or an extended pattern (e.g. compound geometry) within an input example. Various techniques have emerged that make deep learning be contextual. One general strategy is contextual encoding, which packs a stimulus input and its context (i.e. surrounding/related details) into a same (e.g. densely) encoded unit that may be applied to an ANN for analysis. One form of contextual encoding is graph embedding, which constructs and prunes (i.e. limits the extent of) a logical graph of (e.g. temporally or semantically) related events or records. The graph embedding may be used as a contextual encoding and input stimulus to an ANN.

Hidden state (i.e. memory) is a powerful ANN enhancement for (especially temporal) sequence processing. Sequencing may facilitate prediction and operational anomaly detection, which can be important techniques. A recurrent neural network (RNN) is a stateful MLP that is arranged in topological steps that may operate more or less as stages of a processing pipeline. In a folded/rolled embodiment, all of the steps have identical connection weights and may share a single one dimensional weight vector for all steps. In a recursive embodiment, there is only one step that recycles some of its output back into the one step to recursively achieve sequencing. In an unrolled/unfolded embodiment, each step may have distinct connection weights. For example, the weights of each step may occur in a respective column of a two dimensional weight matrix.

A sequence of inputs may be simultaneously or sequentially applied to respective steps of an RNN to cause analysis of the whole sequence. For each input in the sequence, the RNN predicts a next sequential input based on all previous inputs in the sequence. An RNN may predict or otherwise output almost all of the input sequence already received and also a next sequential input not yet received. Prediction of a next input by itself may be valuable. Comparison of a predicted sequence to an actually received (and applied) sequence may facilitate anomaly detection. For example, an RNN based spelling model may predict that a U follows a Q while reading a word letter by letter. If a letter actually following the Q is not a U as expected, then an anomaly is detected.

Unlike a neural layer that is composed of individual neurons, each recurrence step of an RNN may be an MLP that is composed of cells, with each cell containing a few specially arranged neurons. An RNN cell operates as a unit of memory. An RNN cell may be implemented by a long short term memory (LSTM) cell. The way LSTM arranges neurons is different from how transistors are arranged in a flip flop, but a same theme of a few control gates that are specially arranged to be stateful is a goal shared by LSTM and digital logic. For example, a neural memory cell may have an input gate, an output gate, and a forget (i.e. reset) gate. Unlike a binary circuit, the input and output gates may conduct an (e.g. unit normalized) numeric value that is retained by the cell, also as a numeric value.

An RNN has two major internal enhancements over other MLPs. The first is localized memory cells such as LSTM, which involves microscopic details. The other is cross activation of recurrence steps, which is macroscopic (i.e. gross topology). Each step receives two inputs and outputs two outputs. One input is external activation from an item in an input sequence. The other input is an output of the adjacent previous step that may embed details from some or all previous steps, which achieves sequential history (i.e. temporal context). The other output is a predicted next item in the sequence. Example mathematical formulae and techniques for RNNs and LSTM are taught in related U.S. patent application Ser. No. 15/347,501, entitled "MEMORY CELL

UNIT AND RECURRENT NEURAL NETWORK INCLUDING MULTIPLE MEMORY CELL UNITS."

Sophisticated analysis may be achieved by a so-called stack of MLPs. An example stack may sandwich an RNN between an upstream encoder ANN and a downstream decoder ANN, either or both of which may be an autoencoder. The stack may have fan-in and/or fan-out between MLPs. For example, an RNN may directly activate two downstream ANNs, such as an anomaly detector and an autodecoder. The autodecoder might be present only during model training for purposes such as visibility for monitoring training or in a feedback loop for unsupervised training. RNN model training may use backpropagation through time, which is a technique that may achieve higher accuracy for an RNN model than with ordinary backpropagation. Example mathematical formulae, pseudocode, and techniques for training RNN models using backpropagation through time are taught in related W.I.P.O. patent application No. PCT/US2017/033698, entitled "MEMORY-EFFICIENT BACKPROPAGATION THROUGH TIME".

Random Forest

Random forests or random decision forests are an ensemble of learning approaches that construct a collection of randomly generated nodes and decision trees during the training phase. The different decision trees are constructed to be each randomly restricted to only particular subsets of feature dimensions of the data set. Therefore, the decision trees gain accuracy as the decision trees grow without being forced to over fit the training data as would happen if the decision trees were forced to be restricted to all the feature dimensions of the data set. Predictions for the time-series are calculated based on the mean of the predictions from the different decision trees.

Software Overview

Figure 17:
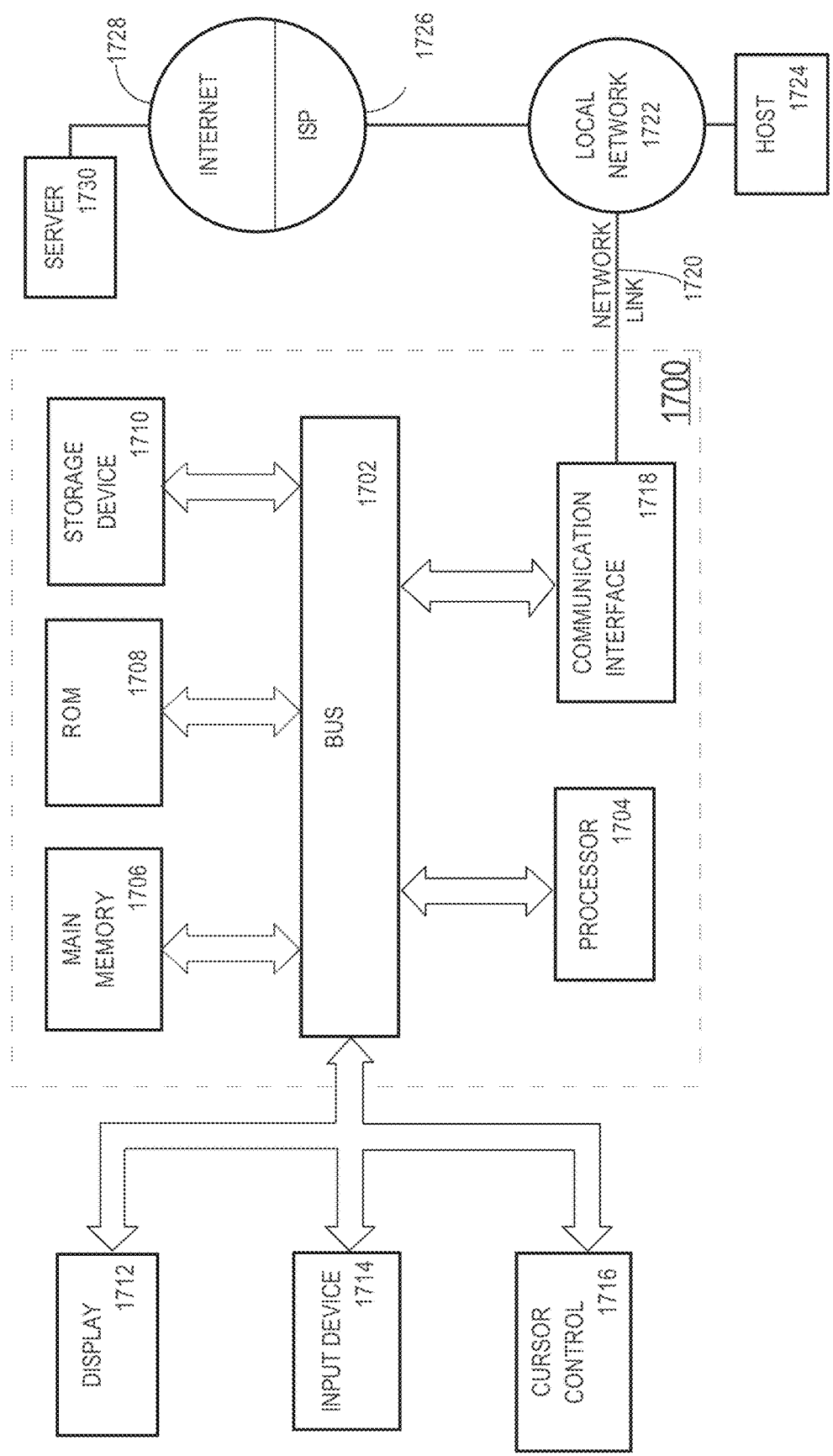
FIG. 17 is a diagram depicting a computer system that may be used in an embodiment.

FIG. 17 is a block diagram of a basic software system 1700 that may be employed for controlling the operation of computing system 1800 of FIG. 18. Software system 1700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1700 is provided for directing the operation of computing system 1800. Software system 1700, which may be stored in system memory (RAM) 1806 and on fixed storage (e.g., hard disk or flash memory) 1810, includes a kernel or operating system (OS) 1710.

The OS 1710 manages low-level aspects of computer operation, including managing execution of processes, memory allocation, file input and output (I/O), and device I/O. One or more application programs, represented as 1702A, 1702B, 1702C . . . 1702N, may be "loaded" (e.g., transferred from fixed storage 1710 into memory 1706) for execution by the system 1700. The applications or other software intended for use on computer system 1700 may also be stored as a set of downloadable computer-executable instructions, for example, for downloading and installation from an Internet location (e.g., a Web server, an app store, or other online service).

Software system 1700 includes a graphical user interface (GUI) 1715, for receiving user commands and data in a graphical (e.g., "point-and-click" or "touch gesture") fashion. These inputs, in turn, may be acted upon by the system 1700 in accordance with instructions from operating system 1710 and/or application(s) 1702. The GUI 1715 also serves to display the results of operation from the OS 1710 and application(s) 1702, whereupon the user may supply additional inputs or terminate the session (e.g., log off).

OS 1710 can execute directly on the bare hardware 1720 (e.g., processor(s) 1804) of computer system 1800. Alternatively, a hypervisor or virtual machine monitor (VMM) 1730 may be interposed between the bare hardware 1720 and the OS 1710. In this configuration, VMM 1730 acts as a software "cushion" or virtualization layer between the OS 1710 and the bare hardware 1720 of the computer system 1000.

VMM 1730 instantiates and runs one or more virtual machine instances ("guest machines"). Each guest machine comprises a "guest" operating system, such as OS 1710, and one or more applications, such as application(s) 1702, designed to execute on the guest operating system. The VMM 1730 presents the guest operating systems with a virtual operating platform and manages the execution of the guest operating systems.

In some instances, the VMM 1730 may allow a guest operating system (OS) to run as if the guest OS is running on the bare hardware 1720 of computer system 1800 directly. In these instances, the same version of the guest operating system configured to execute on the bare hardware 1720 directly may also execute on VMM 1730 without modification or reconfiguration. In other words, VMM 1730 may provide full hardware and CPU virtualization to a guest operating system in some instances.

In other instances, a guest operating system may be specially designed or configured to execute on VMM 1730 for efficiency. In these instances, the guest operating system is "aware" that it executes on a virtual machine monitor. In other words, VMM 1730 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Multiple threads may run within a process. Each thread also comprises an allotment of hardware processing time but share access to the memory allotted to the process. The memory is used to store content of processors between the allotments when the thread is not running. The term thread may also be used to refer to a computer system process in multiple threads are not running.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 18 is a block diagram that illustrates a computer system 1800 upon which an embodiment of the invention may be implemented. Computer system 1800 includes a bus 1802 or other communication mechanism for communicating information, and a hardware processor 1804 coupled with bus 1802 for processing information. Hardware processor 1804 may be, for example, a general purpose microprocessor.

Computer system 1800 also includes a main memory 1806, such as a random access memory (RAM) or other dynamic storage device, coupled to bus 1802 for storing information and instructions to be executed by processor 1804. Main memory 1806 also may be used for storing temporary variables or other intermediate information during execution of instructions to be executed by processor 1804. Such instructions, when stored in non-transitory storage media accessible to processor 1804, render computer system 1800 into a special-purpose machine that is customized to perform the operations specified in the instructions.

Computer system 1800 further includes a read only memory (ROM) 1808 or other static storage device coupled to bus 1802 for storing static information and instructions for processor 1804. A storage device 1810, such as a magnetic disk, optical disk, or solid-state drive is provided and coupled to bus 1802 for storing information and instructions.

Computer system 1800 may be coupled via bus 1802 to a display 1812, such as a cathode ray tube (CRT), for displaying information to a computer user. An input device 1814, including alphanumeric and other keys, is coupled to bus 1802 for communicating information and command selections to processor 1804. Another type of user input device is cursor control 1816, such as a mouse, a trackball, or cursor direction keys for communicating direction information and command selections to processor 1804 and for controlling cursor movement on display 1812. This input device typically has two degrees of freedom in two axes, a first axis (e.g., x) and a second axis (e.g., y), that allows the device to specify positions in a plane.

Computer system 1800 may implement the techniques described herein using customized hard-wired logic, one or more ASICs or FPGAs, firmware and/or program logic which in combination with the computer system causes or programs computer system 1800 to be a special-purpose machine. According to one embodiment, the techniques herein are performed by computer system 1800 in response to processor 1804 executing one or more sequences of one or more instructions contained in main memory 1806. Such instructions may be read into main memory 1806 from another storage medium, such as storage device 1810. Execution of the sequences of instructions contained in main memory 1806 causes processor 1804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1810. Volatile media includes dynamic memory, such as main memory 1806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1802. Transmission media can also take the form of acoustic or light waves, such as those generated during radio-wave and infra-red data communications.

Various forms of media may be involved in carrying one or more sequences of one or more instructions to processor 1804 for execution. For example, the instructions may initially be carried on a magnetic disk or solid-state drive of a remote computer. The remote computer can load the instructions into its dynamic memory and send the instructions over a telephone line using a modem. A modem local to computer system 1800 can receive the data on the telephone line and use an infra-red transmitter to convert the data to an infra-red signal. An infra-red detector can receive the data carried in the infra-red signal and appropriate circuitry can place the data on bus 1802. Bus 1802 carries the data to main memory 1806, from which processor 1804 retrieves and executes the instructions. The instructions received by main memory 1806 may optionally be stored on storage device 1810 either before or after execution by processor 1804.

Computer system 1800 also includes a communication interface 1818 coupled to bus 1802. Communication interface 1818 provides a two-way data communication coupling to a network link 1820 that is connected to a local network 1822. For example, communication interface 1818 may be an integrated services digital network (ISDN) card, cable modem, satellite modem, or a modem to provide a data communication connection to a corresponding type of telephone line. As another example, communication interface 1818 may be a local area network (LAN) card to provide a data communication connection to a compatible LAN. Wireless links may also be implemented. In any such implementation, communication interface 1818 sends and receives electrical, electromagnetic or optical signals that carry digital data streams representing various types of information.

Network link 1820 typically provides data communication through one or more networks to other data devices. For example, network link 1820 may provide a connection through local network 1822 to a host computer 1824 or to data equipment operated by an Internet Service Provider (ISP) 1826. ISP 1826 in turn provides data communication services through the world wide packet data communication network now commonly referred to as the "Internet" 1828. Local network 1822 and Internet 1828 both use electrical, electromagnetic or optical signals that carry digital data streams. The signals through the various networks and the signals on network link 1820 and through communication interface 1818, which carry the digital data to and from computer system 1800, are example forms of transmission media.

Computer system 1800 can send messages and receive data, including program code, through the network(s), network link 1820 and communication interface 1818. In the Internet example, a server 1830 might transmit a requested code for an application program through Internet 1828, ISP 1826, local network 1822 and communication interface 1818.

The received code may be executed by processor 1804 as it is received, and/or stored in storage device 1810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising:
   generating training data comprising training input data and training output data, said training input data comprising first input features generated from first sensor data from an out-of-band subsystem of a computer system, said training output data including computer resource usage metrics about a first computer system;
   using the first input features and the training output data, training a particular machine learning model to predict workload utilization;
   receiving sensor data from a second out-of-band subsystem on a second computer;
   generating second input features based on said sensor data;
   generating a prediction of workload utilization on said second computer using said particular machine learning model; and
   wherein the method is performed by one or more computing devices.

2. The method of claim 1, further including generating training data by at least executing a set of one or more benchmark applications to generate workload metrics about workload utilization of a central processing unit (CPU) of said first computer system, wherein the first input features include values generated from sensor data about at least one of:
   CPU power usage;
   chassis power usage;
   output power supply; and
   input power supply.

3. The method of claim 1, further including generating training data by at least executing a set of one or more benchmark applications to generate workload metrics about memory bandwidth utilization, wherein the first input features include values generated from sensor data about at least one of:
   output power supply;
   memory power usage;
   input power supply; and
   motherboard fan speed.

4. The method of claim 1, further including generating training data by at least:
   executing a set of one or more benchmark applications to generate network metrics about network I/O; and
   wherein the training output data includes data generated from switch utilization data generated on physical network switches.

5. The method of claim 1, wherein the training the first input features includes a particular feature calculated from two or more other features of said first input features.

6. The method of claim 1, further including:
   generating candidate input features, each candidate input feature of said candidate input features being based on sensor data generated from a particular sensor of said out-of-band subsystem;
   for each candidate input feature of said candidate input features, determining a respective correlation between said each candidate input feature and at least one output feature of said training output data; and
   selecting a particular candidate input feature of said candidate input features to include as an input feature of said first input features based on the respective correlation determined for said particular candidate input feature.

7. The method of claim 1, wherein the particular machine learning model is a random forest machine learning model.

8. A method, comprising:
generating particular training data, said particular training data including particular training output data and particular training input data generated from particular server sensor data, said particular training output data including server usage metrics generated by at least one computer, network usage metrics generated by one or more devices connected to a first network or said at least one computer, memory usage metrics generated by said at least one computer;
wherein generating particular training data includes generating:
first training input features generated from said particular server sensor data,
second training input features generated from said particular server sensor data, and
third training input features generated from said particular server sensor data;
using the first training input features and the server usage metrics, training a first machine learning model to predict workload utilization;
using the second training input features and the memory usage metrics, training a second machine learning model to predict memory utilization;
using the third training input features and the network usage metrics, training a third machine learning model to predict network utilization;
generating second sensor data from a second out-of-band subsystem on a second computer;
using the second sensor data:
using the first machine learning model to generate a predicted workload utilization;
using the second machine learning model to generate a predicted memory utilization; and
using the third machine learning model to generate a predicted network utilization; and
generating a signature comprising said predicted workload utilization, said predicated network utilization, said predicted memory utilization, and a context, said context specifying a machine type and a workload name identifying a workload type.

9. The method of claim 8, further comprising determining, based on the generated signature, a deployment score, wherein the deployment score is an assessment regarding pairing the identified workload type with the specified machine type.

10. The method of claim 9, further comprising determining, based on the assessment, a recommendation for a machine type for the identified workload type.

11. One or more non-transitory storage media storing sequences of instructions which, when executed by one or more processors, cause:
generating training data comprising training input data and training output data, said training input data comprising first input features generated from first sensor data from an out-of-band subsystem of a computer system, said training output data including computer resource usage metrics about a first computer system;
using the first input features and the training output data, training a particular machine learning model to predict workload utilization;
receiving sensor data from a second out-of-band subsystem on a second computer;
generating second input features based on said sensor data; and
generating a prediction of workload utilization on said second computer using said particular machine learning model.

12. The one or more non-transitory storage media of claim 11, wherein the sequences of instructions include instructions that, when executed by said one or more processors, cause generating training data by at least executing a set of one or more benchmark applications to generate workload metrics about workload utilization of a central processing unit (CPU) of said first computer system, wherein the first input features include values generated from sensor data about at least one of:
CPU power usage;
chassis power usage;
output power supply; and
input power supply.

13. The one or more non-transitory storage media of claim 11, wherein the sequences of instructions include instructions that, when executed by said one or more processors, cause generating training data by at least executing a set of one or more benchmark applications to generate workload metrics about memory bandwidth utilization, wherein the input features include values generated from sensor data about at least one of:
output power supply;
memory power usage;
input power supply; and
motherboard fan speed.

14. The one or more non-transitory storage media of claim 11, wherein the sequences of instructions include instructions that, when executed by said one or more processors, cause generating training data by at least:
executing a set of one or more benchmark applications to generate network metrics about network I/O; and
wherein the training output data includes data generated from switch utilization data generated on physical network switches.

15. The one or more non-transitory storage media of claim 11, wherein the training the first input features includes a particular feature calculated from two or more other features of said first input features.

16. The one or more non-transitory storage media of claim 11, wherein the sequences of instructions include instructions that, when executed by said one or more processors, cause:
generating candidate input features, each candidate input feature of said candidate input features being based on sensor data generated from a particular sensor of said out- of-band subsystem;
for each candidate input feature of said candidate input features, determining a respective correlation between said each candidate input feature and at least one output feature of said training output data; and
selecting a particular candidate input feature of said candidate input features to include as an input feature of said first input features based on the respective correlation determined for said particular candidate input feature.

17. The one or more non-transitory storage media of claim 11, wherein the particular machine learning model is a random forest machine learning model.

18. One or more non-transitory storage media storing sequences of instructions which, when executed by one or more processors, cause:
  generating particular training data, said particular training data including particular training output data and particular training input data generated from particular server sensor data, said particular training output data including server usage metrics generated by at least one computer, network usage metrics generated by one or more devices connected to a first network or said at least one computer, memory usage metrics generated by said at least one computer;
  wherein generating particular training data includes generating:
    first training input features generated from said particular server sensor data,
    second training input features generated from said particular server sensor data, and
    third training input features generated from said particular server sensor data;
  using the first training input features and the server usage metrics, training a first machine learning model to predict workload utilization;
  using the second training input features and the memory usage metrics, training a second machine learning model to predict memory utilization;
  using the third training input features and the network usage metrics, training a third machine learning model to predict network utilization;
  generating second sensor data from a second out-of-band subsystem on a second computer;
  using the second sensor data:
    using the first machine learning model to generate a predicted workload utilization;
    using the second machine learning model to generate a predicted memory utilization; and
    using the third machine learning model to generate a predicted network utilization; and
  generating a signature comprising said predicted workload utilization, said predicated network utilization, said predicted memory utilization, and a context, said context specifying a machine type and a workload name identifying a workload type.

19. The one or more non-transitory storage media of claim 18, wherein the sequences of instructions include instructions that, when executed by said one or more processors, cause determining, based on the generated signature, a deployment score, wherein the deployment score is an assessment regarding pairing the identified workload type with the specified machine type.

20. The one or more non-transitory storage media of claim 19, wherein the sequences of instructions include instructions that, when executed by said one or more processors, cause determining, based on the assessment, a recommendation for a machine type for the identified workload type.

* * * * *

UNITED STATES PATENT AND TRADEMARK OFFICE
CERTIFICATE OF CORRECTION

PATENT NO. : 11,423,327 B2 Page 1 of 2
APPLICATION NO. : 16/156925
DATED : August 23, 2022
INVENTOR(S) : Kocberber et al.

It is certified that error appears in the above-identified patent and that said Letters Patent is hereby corrected as shown below:

On the Title Page

On page 2, Column 1, under Item (56) Other Publications, Line 1, delete "Doftware-Defined" and insert -- Software-Defined --, therefor.

On page 2, Column 2, under Item (56) Other Publications, Line 55, delete "ARIMA" and insert -- ARMA --, therefor.

In the Specification

In Column 4, Line 27, delete "necessary" and insert -- necessary. --, therefor.

In Column 4, Line 37, delete "model" and insert -- model. --, therefor.

In Column 7, Line 5, delete "machine learning input(input[f])" and insert -- machine_learning_input(input[f]) --, therefor.

In Column 7, Line 49, delete "((/SYS/VPS_CPUS)" and insert -- (/SYS/VPS_CPUS) --, therefor.

In Column 13, Line 5, delete "hypervisor)" and insert -- hypervisor). --, therefor.

In Column 13, Line 7, delete "server" and insert -- server. --, therefor.

In Column 13, Line 17, delete "facility" and insert -- facility. --, therefor.

In Column 16, Line 18, delete "and or" and insert -- and/or --, therefor.

In the Claims

In Column 24, Line 12, in Claim 1, delete "system," and insert -- system --, therefor.

Signed and Sealed this
Fourteenth Day of February, 2023

Katherine Kelly Vidal
*Director of the United States Patent and Trademark Office*

CERTIFICATE OF CORRECTION (continued)
U.S. Pat. No. 11,423,327 B2

In Column 24, Line 61, in Claim 6, delete "out- of-band" and insert -- out-of-band --, therefor.

In Column 25, Line 63, in Claim 11, delete "system," and insert -- system --, therefor.

In Column 26, Line 55, in Claim 16, delete "out- of-band" and insert -- out-of-band --, therefor.